(12) United States Patent
Koyama

(10) Patent No.: US 11,307,374 B2
(45) Date of Patent: Apr. 19, 2022

(54) LENS DEVICE, IMAGING SYSTEM, MOVABLE OBJECT, AND CONTROL METHOD

(71) Applicant: SZ DJI TECHNOLOGY CO., LTD., Shenzhen (CN)

(72) Inventor: Takashi Koyama, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 434 days.

(21) Appl. No.: 16/386,642

(22) Filed: Apr. 17, 2019

(65) Prior Publication Data

US 2019/0243085 A1   Aug. 8, 2019

Related U.S. Application Data

(63) Continuation of application No. PCT/JP2016/081696, filed on Oct. 26, 2016.

(51) Int. Cl.
| | |
|---|---|
| G02B 7/02 | (2021.01) |
| G03B 17/56 | (2021.01) |
| F16M 11/12 | (2006.01) |
| B64C 39/02 | (2006.01) |
| H04N 5/225 | (2006.01) |
| G03B 15/00 | (2021.01) |
| H04N 5/232 | (2006.01) |

(Continued)

(52) U.S. Cl.
CPC ............ *G02B 7/021* (2013.01); *B64C 39/024* (2013.01); *F16M 11/123* (2013.01); *G02B 7/04* (2013.01); *G02B 7/10* (2013.01); *G03B 5/00* (2013.01); *G03B 15/006* (2013.01); *G03B 17/561* (2013.01); *H04N 5/225* (2013.01); *H04N 5/2254* (2013.01); *H04N 5/232* (2013.01); *B64C 2201/127* (2013.01); *G03B 2205/0015* (2013.01)

(58) Field of Classification Search
USPC ......................................................... 359/819
See application file for complete search history.

(56) References Cited

U.S. PATENT DOCUMENTS 5,162,831 A * 11/1992 Haraguchi ............ G02B 7/102
396/148
6,130,705 A * 10/2000 Lareau ..................... G01C 3/08
348/144

(Continued)

FOREIGN PATENT DOCUMENTS

| EP | 2423724 A1 | 2/2012 |
| JP | S58154822 A | 9/1983 |

(Continued)

OTHER PUBLICATIONS

World Intellectual Property Organization (WIPO) International Search Report for PCT/JP2016/081696 dated Jan. 24, 2017 5 Pages.

*Primary Examiner* — Clayton E. LaBalle
*Assistant Examiner* — Warren K Fenwick
(74) *Attorney, Agent, or Firm* — Anova Law Group, PLLC

(57) ABSTRACT

A lens device includes a first lens system including a first lens, a second lens system including a second lens, a moving member configured to move in an optical axis direction of the first lens, and a physical structure configured to move the first lens in the optical axis direction and move the moving member in a direction opposite to a movement direction of a center of gravity of a physical system that includes the first lens.

20 Claims, 21 Drawing Sheets

(51) Int. Cl.
*G02B 7/10* (2021.01)
*G03B 5/00* (2021.01)
*G02B 7/04* (2021.01)

(56) References Cited

U.S. PATENT DOCUMENTS

| | | | | |
|---|---|---|---|---|
| 8,137,007 | B1* | 3/2012 | Harvey | F16M 11/10 |
| | | | | 396/427 |
| 9,156,551 | B2* | 10/2015 | Szarek | F16M 11/126 |
| 10,287,011 | B2* | 5/2019 | Wolff | B64C 39/024 |
| 2012/0050887 | A1* | 3/2012 | Yokoyama | G02B 7/023 |
| | | | | 359/699 |

FOREIGN PATENT DOCUMENTS

| | | |
|---|---|---|
| JP | H08022068 A | 1/1996 |
| JP | 2010039350 A | 2/2010 |
| JP | 2010283610 A | 12/2010 |
| JP | 2012048178 A | 3/2012 |

\* cited by examiner

FIG. 12

| Object distance (mm) | Position (mm) | | | Moment (g·mm) | | | |
|---|---|---|---|---|---|---|---|
| | First focus lens R2 surface | Second focus lens R2 surface | Cam ring (relative position) | First focus lens R2 surface | Second focus lens R2 surface | Cam ring (relative position) | Total | Change (wide-angle baseline) |
| 500 | 14.157 | 9.278 | 0 | 141.574 | 37.114 | 0 | 178.6876 | 0 |
| 600 | 14.043 | 9.578 | −0.0075 | 140.434 | 38.314 | −0.06 | 178.6876 | 0 |
| 1000 | 13.549 | 9.878 | 0.460125 | 135.493 | 39.514 | 3.681 | 178.6876 | 0 |
| 2000 | 13.190 | 10.178 | 0.759 | 131.902 | 40.714 | 6.072 | 178.6876 | 0 |
| ∞ | 12.968 | 10.968 | 0.642825 | 129.875 | 43.870 | 5.1426 | 178.6876 | 0 |
| Baseline position | Image plane = 0 | Image plane = 0 | Wide angle = 0 | | | | | |

| Mass (g) | 10 | 4 | 8 |
|---|---|---|---|

LENS DEVICE, IMAGING SYSTEM, MOVABLE OBJECT, AND CONTROL METHOD

CROSS-REFERENCE TO RELATED APPLICATION

This application is a continuation of International Application No. PCT/JP2016/081696, filed on Oct. 26, 2016, the entire content of which is incorporated herein by reference.

FIELD

The disclosed embodiments relate to a lens device, an imaging system, a movable object, and a control method.

BACKGROUND

In Japanese Unexamined Publication No. H08-022068, when a lens moves due to a zoom operation or a focus operation, a stabilizer disclosed in the application moves an auxiliary balance weight in the opposite direction from the movement direction of the lens. A structure for adjusting weight balance that is disclosed in Japanese Unexamined Publication No. 2010-39350 achieves weight balance by moving a weight in conjunction with a zoom action of a zoom lens.

Patent Literature 1 Japanese Unexamined Publication No. H08-022068

Patent Literature 2 Japanese Unexamined Publication No. 2010-39350

When a dedicated motor is used to move a weight that inhibits a change in the position of the center of gravity of a physical system that includes a lens, reducing the size and weight of a lens device can be challenging.

The lens device according to an aspect of the present disclosure can include a first lens system for adjusting a focusing distance. The first lens system can include at least one first lens. The lens device can include a second lens system that includes at least one second lens. The lens device can include a first moving member capable of moving in an optical axis direction of the at least one first lens. The lens device can include a first physical structure for moving the at least one first lens in the optical axis direction, and also for moving the first moving member in the opposite direction from a movement direction of the center of gravity of a physical system that includes the at least one first lens.

The lens device can include a first lens holding member for holding the at least one first lens. The first physical structure can include a first cam portion provided to one of the first lens holding member and the first moving member. The first physical structure can include a first follower portion provided to the other of the first lens holding member and the first moving member, the first follower portion moving along a cam surface of the first cam portion and thereby causing the first lens holding member and the first moving member to move relative to each other.

The first moving member can be a first cam ring. The first moving member can be a material having a specific gravity greater than that of the at least one lens. The first moving member can be a metal.

The second lens system can be a single focus lens system. The second lens system can be a zoom lens system. The lens device can include a second moving member capable of moving in an optical axis direction of the at least one second lens. The lens device can include a second physical structure for moving the at least one second lens in the optical axis direction, and also for moving the second moving member in the opposite direction from a movement direction of the center of gravity of a physical system that includes the at least one second lens.

The lens device can include a second lens holding member for holding the at least one second lens. The second physical structure can include a second cam portion provided to one of the second lens holding member and the second moving member. The second physical structure can include a second follower portion provided to the other of the second lens holding member and the second moving member, the second follower portion moving along a cam surface of the second cam portion and thereby causing the second lens holding member and the second moving member to move relative to each other.

The second moving member can be a cam ring. The second moving member can be a material having a specific gravity greater than that of the at least one second lens. The second moving member can be a metal.

The lens device can include a light amount adjustment mechanism moving together with the one first lens or a portion of a plurality of first lenses, and adjusting an amount of light that passes through the at least one first lens. The second physical structure can move the second moving member in the opposite direction from a movement direction of the center of gravity of a physical system that includes the light amount adjustment mechanism. The light amount adjustment mechanism can include an aperture capable of modifying an opening diameter thereof. The light amount adjustment mechanism can include an actuator for driving the aperture and modifying the opening diameter.

The imaging system according to an aspect of the present disclosure can include a lens device. The imaging system can include an imaging device for imaging light focused by the lens device.

The imaging system can include a carrier for supporting at least one of the lens device and the imaging device. The carrier can support the lens device and the imaging device such that the lens device and the imaging device can rotate on a rotation axis running through a predetermined range of distance from the center of gravity of the physical system that includes the lens device and the imaging device. The carrier can support the lens device and the imaging device such that the lens device and the imaging device can rotate on a rotation axis running through the center of gravity of the physical system that includes the lens device and the imaging device.

A movable object according to an aspect of the present disclosure can include the imaging system. The movable object can be an unmanned aerial vehicle.

The imaging system can include a holding arm attached to the carrier.

A control method according to an aspect of the present disclosure can be a control method of a lens device that includes a first lens system for adjusting a focusing distance, the first lens system including at least one first lens; a second lens system that includes at least one second lens; and a first moving member capable of moving in an optical axis direction of the at least one first lens. The control method can include a first physical structure moving the at least one first lens in the optical axis direction, and also moving the first moving member in the opposite direction from a movement direction of the center of gravity of a physical system that includes the at least one first lens.

By moving the at least one first lens in the optical axis direction and also moving the first moving member in the opposite direction from the movement direction of the center of gravity of the physical system that includes the at least one first lens, a change in the position of the center of gravity of the physical system that includes a lens can be inhibited with a more simplified structure.

The features described above can also be arranged into a variety of sub-combinations.

BRIEF DESCRIPTION OF THE DRAWINGS

FIG. 12 illustrates one example of a relationship between the distance from the baseline position of the focus lens system in the wide angle position, the focusing distance, and a physical quantity obtained by multiplying mass by the distance from the baseline position.

DETAILED DESCRIPTION OF THE EMBODIMENTS

The present disclosure is described below using embodiments of the disclosure, but the embodiments below do not limit the disclosure according to the scope of the claims. Not all combinations of features described in the embodiments are necessary to achieve the disclosure.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

Figure 1:
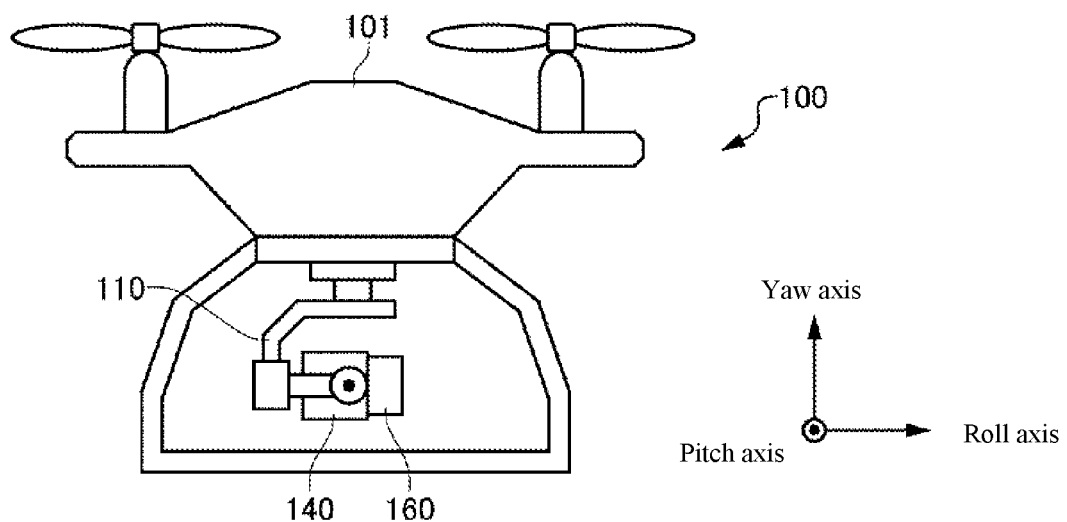
FIG. 1 illustrates one example of an exterior of an unmanned aerial vehicle (UAV).

FIG. 1 illustrates one example of an exterior of an unmanned aerial vehicle (UAV) 100. The UAV 100 can include a UAV body 101, a gimbal 110, an imaging device 140, and a lens device 160. The gimbal 110, the imaging device 140, and the lens device 160 are one example of an imaging system. The gimbal 110 is one example of a carrier. The UAV 100 is one example of a movable object to which the imaging system is provided. The movable object can be a concept that includes, in addition to UAVs, other aerial vehicles moving in the air, vehicles moving on the ground, ships moving in the water, and the like.

The UAV body 101 can include a plurality of rotary wings. The UAV body 101 can cause the UAV 100 to fly by controlling the rotation of the plurality of rotary wings. For example, the UAV body 101 can cause the UAV 100 to fly by using four rotary wings. The number of rotary wings is not limited to four. Also, the UAV 100 can be a fixed-wing aircraft that does not have rotary wings.

The gimbal 110 can support the imaging device 140 and/or the lens device 160. The imaging device 140 and/or the lens device 160 can be rotatably supported by the gimbal 110. The gimbal 110 can also support the imaging device 140 and the lens device 160 such that the imaging device 140 and the lens device 160 can rotate on a rotation axis running through the center of gravity of a physical system that includes the imaging device 140 and the lens device 160. For example, the gimbal 110 can rotatably support the imaging device 140 and the lens device 160 on a pitch axis that runs through the center of gravity of the physical system that includes the imaging device 140 and the lens device 160. The gimbal 110 can further rotatably support the imaging device 140 and the lens device 160 such that the imaging device 140 and the lens device 160 can rotate centered on each of a roll axis and a yaw axis. The gimbal 110 can support the imaging device 140, and can support the lens device 160. The lens device 160 can also include the imaging device 140. In such a case, the lens device 160 and the imaging device 140 together form a lens body.

The imaging device 140 can generate and record image data of optical images formed via the lens device 160. The lens device 160 can be integrally provided with the imaging device 140. The lens device 160 can be a so-called "interchangeable lens," and can be detachably provided on the imaging device 140.

Figure 2:
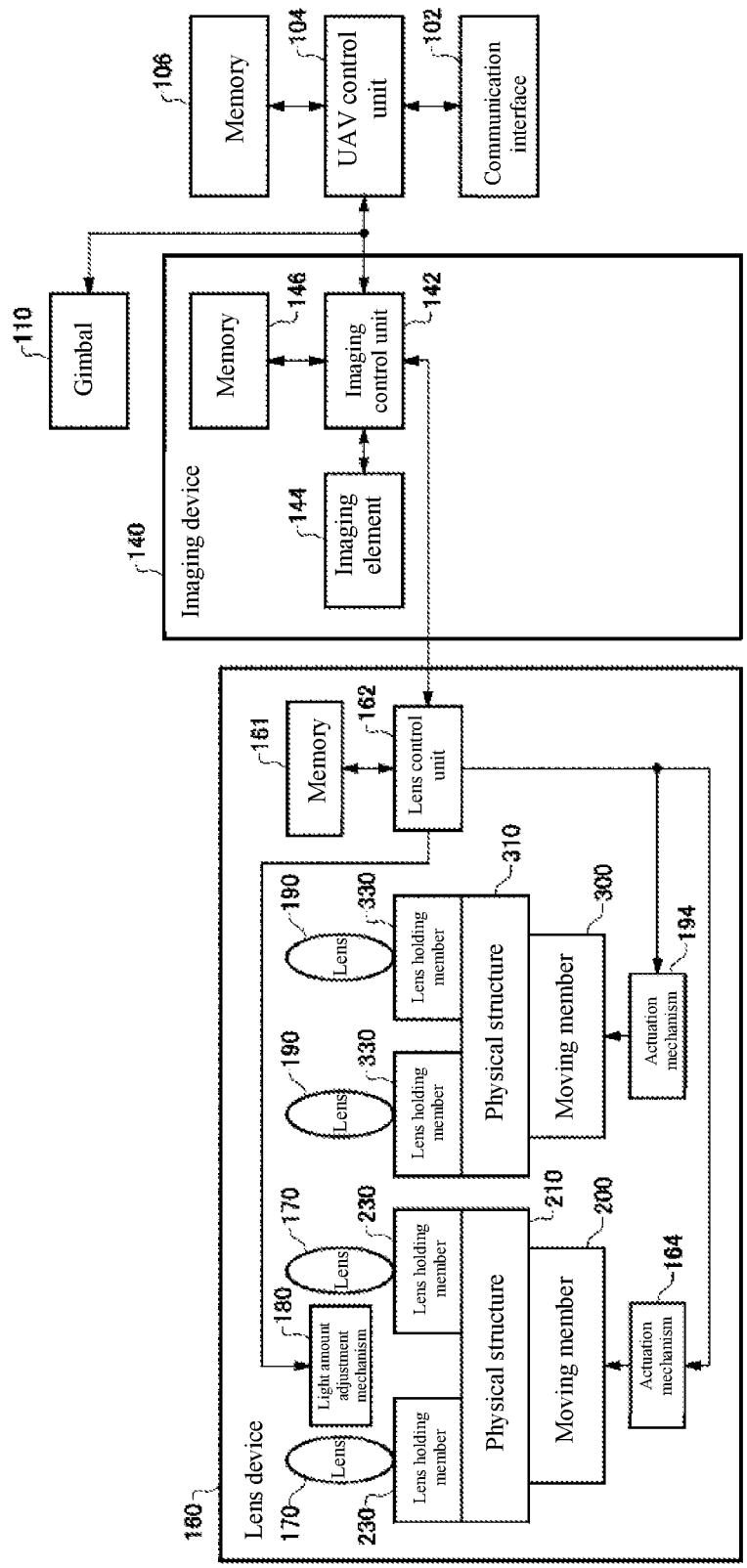
FIG. 2 illustrates one example of a UAV function block.

FIG. 2 illustrates one example of a function block of the UAV 100. The UAV 100 can include a communication interface 102, a UAV control unit 104, a memory 106, the gimbal 110, the imaging device 140, and the lens device 160.

The communication interface 102 can communicate with an external transmitter. The communication interface 102 receives a variety of instructions from a remote transmitter. The UAV control unit 104 can control the flight of the UAV 100 following the instructions received from the transmitter. The UAV control unit 104 can control the gimbal 110, the imaging device 140, and the lens device 160. The UAV control unit 104 can be configured from a microprocessor such as a CPU or MPU, a microcontroller such as an MCU, or the like. The memory 106 stores programs and the like necessary for the UAV control unit 104 to control the gimbal 110, the imaging device 140, and the lens device 160. The memory 106 can be a computer-readable recording medium, and can include at least one from among SRAM, DRAM, EPROM, EEPROM, and flash memory such as USB memory. The memory 106 can be provided to the housing of the UAV 100. The memory 106 can be provided such that it is removable from the housing of the UAV 100.

The imaging device 140 can include an imaging control unit 142, an imaging element 144, and a memory 146. The imaging device 140 can image light focused by the lens device 160. The imaging element 144 can generate and output to the imaging control unit 142 image data of an optical image formed via the lens device 160. The imaging element 144 can be configured from CCD or CMOS. The imaging control unit 142 can store image data output from the imaging element 144 in the memory 146. The imaging control unit 142 can output image data to the memory 106 to be stored therein, via the UAV control unit 104. The imaging control unit 142 can control the imaging device 140 and the lens device 160 according to action instructions for the imaging device 140 and the lens device 160 provided from the UAV control unit 104. The imaging control unit 142 can be configured from a microprocessor such as a CPU or MPU, a microcontroller such as an MCU, or the like. The memory 146 can be a computer-readable recording medium, and can include at least one from among SRAM, DRAM, EPROM, EEPROM, and flash memory such as USB memory. The memory 146 can be provided inside the housing of the imaging device 140. The memory 146 can be provided such that it is removable from the housing of the imaging device 140.

The lens device 160 can include a memory 161, a lens control unit 162, an actuation mechanism 164, a moving member 200, a physical structure 210, a plurality of lens holding members 230, a plurality of lenses 170, a light amount adjustment mechanism 180, a plurality of lenses 190, a plurality of lens holding members 330, a physical structure 310, a moving member 300, and an actuation mechanism 194. At least one, or all, of the plurality of lenses 170 can be disposed movably along an optical axis. The plurality of lenses 170 can be configured from a plurality of lens groups. The plurality of lenses 170 can function as a zoom lens system. The plurality of lenses 170 can also function as a varifocal lens. The plurality of lenses 170 can also function as a single focus lens system.

At least one, or all, of the plurality of lenses 190 can be disposed movably along an optical axis. The plurality of lenses 190 can be configured from a plurality of lens groups. The plurality of lenses 190 can also function as a focus lens system that can adjust a focusing distance.

The memory 161 can store a control value for the plurality of lenses 170 that are operated via the actuation mechanism 164, a control value for the plurality of lenses 190 that are operated by the separate actuation mechanism 194, and the like. The lens device 160 should include at least one lens 170 and at least one lens 190. The lens device 160 can include any number of lenses according to the optical design of the lens device 160.

Following lens action instructions from the imaging control unit 142, the lens control unit 162 can drive the actuation mechanism 164 based on the control value stored in the memory 161, and can move the plurality of lenses 170 in an optical axis direction. The lens control unit 162 can further drive the actuation mechanism 194 based on another control value stored in the memory 161, and can move the plurality of lenses 190 in the optical axis direction. The lens control unit 162 can adjust the focusing distance by causing the plurality of lenses 190 to move in the optical axis direction in conjunction with the movement of the plurality of lenses 170 in the optical axis direction. The lens control unit 162 can cause the plurality of lenses 190 to function as a floating focus by causing the plurality of lenses 190 to move in the optical axis direction in conjunction with the movement of the plurality of lenses 170 in the optical axis direction. The lens control unit 162 can further adjust the focusing distance by causing the plurality of lenses 190 to move in the optical axis direction independently of the movement of the plurality of lenses 170 in the optical axis direction.

The lens holding members 230 can hold the lenses 170. Each lens holding member 230 can hold one or a plurality of the lenses 170. Each lens holding member 230 can move along the optical axis while holding one or a plurality of the lenses 170. Each lens holding member 230 can be disposed to be movable along the optical axis within a lens barrel. The lens holding members 330 can hold the lenses 190. Each lens holding member 330 can hold one or a plurality of the lenses 190. Each lens holding member 330 can move along the optical axis while holding one or a plurality of the lenses 190. Each lens holding member 330 can be disposed to be movable along the optical axis within the lens barrel.

The light amount adjustment mechanism 180 can move together with one or a portion of the plurality of lenses 170, and can adjust the amount of light that passes through the one or plurality of lenses 170. The light amount adjustment mechanism 180 can include an aperture capable of modifying an opening diameter thereof, and an actuator that drives the aperture and modifies the opening diameter.

The moving member 200 can be a member that inhibits a change in the position of the center of gravity of the physical system that includes the one or plurality of lenses 170. The moving member 200 is one example of a second moving member. The moving member 200 can inhibit a change in the position of the center of gravity of the lens device 160 that is associated with the movement of the one or plurality of lenses 170 in the optical axis direction. The moving member 200 can move in the optical axis direction of the one or plurality of lenses 170. The moving member 200 can also move parallel to the optical axis direction of the one or plurality of lenses 170. The moving member 200 can also move in the opposite direction from the movement direction of the center of gravity of the physical system that includes the one or plurality of lenses 170. The moving member 200 can move in the optical axis direction using power supplied by the actuation mechanism 164. The moving member 200 can be configured by any material, so long as the member can inhibit a change in the position of the center of gravity of the lens device 160. The moving member 200 can be a material having a specific gravity greater than that of the one or plurality of lenses 170. The moving member 200 can be a metal. The moving member 200 can be, for example, a cam ring. The moving member 200 can also be a lens, and can also be a simple weight that is only used to constrain the position of the center of gravity of the lens device 160. The moving member 200 can be disposed inside the lens barrel of the lens device 160, or can be disposed outside the lens barrel of the lens device 160.

The moving member 300 can be a member that inhibits a change in the position of the center of gravity of the physical system that includes the one or plurality of lenses 190. The moving member 300 is one example of a first moving member. The moving member 300 can inhibit a change in the position of the center of gravity of the lens device 160 that is associated with the movement of the one or plurality of lenses 190 in the optical axis direction. The moving member 300 can move in the optical axis direction of the one or plurality of lenses 190. The moving member 300 can also move parallel to the optical axis direction of the one or plurality of lenses 190. The moving member 300 can also move in the opposite direction from the movement direction of the center of gravity of the physical system that includes the one or plurality of lenses 190. The moving member 300 can move in the optical axis direction using power supplied by the actuation mechanism 194. The moving member 300 can be configured by any material, so long as the member can inhibit a change in the position of the center of gravity of the lens device 160. The moving member 300 can be a material having a specific gravity greater than that of the one or plurality of lenses 190. The moving member 300 can be a metal. The moving member 300 can be, for example, a cam ring. The moving member 300 can also be a lens, and can also be a simple weight that is only used to constrain the position of the center of gravity of the lens device 160. The moving member 300 can be disposed inside the lens barrel of the lens device 160, or can be disposed outside the lens barrel of the lens device 160.

The amount of movement of the moving member 200 and the moving member 300 can be determined based on the amount of movement of a movable element and the mass of the movable element. The movable element of the moving member 200 can be an element that is provided to the lens device 160 and that moves during a zoom action. The movable element of the moving member 200 can move in the optical axis direction during the zoom action. The movable element of the moving member 200 can include the one or plurality of lenses 170, the light amount adjustment mechanism 180, a cam ring, a linear guide ring, and the like. The amount of movement of the moving member 200 can indicate a distance of the moving member 200 from a baseline position. The amount of movement of the movable element of the moving member 200 can indicate the distance of the movable element from a baseline position. The baseline positions of the moving member 200 and of the movable element of the moving member 200, respectively, can be the respective positions of the moving member 200 and the movable element at the wide angle end of the lens device 160. The distance of the moving member 200 from the baseline position can be set such that a calculated value is no more than a predetermined value. The calculated value can be obtained by multiplying the distance of the movable element from the baseline position by the mass of the movable element to obtain a total physical quantity, then dividing this total physical quantity by the mass of the moving member 200. The distance of the moving member 200 from the baseline position can be set such that a calculated value is no more than a predetermined value. The calculated value can be obtained by multiplying the distance of each of the one or plurality of lenses 170 from the baseline position by the mass of each of the one or plurality of lenses 170 to obtain respective physical quantities, then dividing the sum total of these physical quantities by the mass of the moving member 200.

The movable element of the moving member 300 can move in the optical axis direction during a focus action and during the zoom action. The movable element of the moving member 300 can include the one or plurality of lenses 190, and the like. The amount of movement of the moving member 300 can indicate a distance of the moving member 300 from a baseline position. The amount of movement of the movable element of the moving member 300 can indicate the distance of the movable element from a baseline position. The baseline positions of the moving member 300 and of the movable element of the moving member 300, respectively, can be the respective positions of the moving member 300 and the movable element of the moving member 300 at a baseline focusing distance (for example, 500 mm). The distance of the moving member 300 from the baseline position can be set such that a calculated value is no more than a predetermined value. The calculated value can be obtained by multiplying the distance of the movable element from the baseline position by the mass of the movable element to obtain a total physical quantity, then dividing this total physical quantity by the mass of the moving member 300. The distance of the moving member 300 from the baseline position can be set such that a calculated value is no more than a predetermined value. The calculated value can be obtained by multiplying the distance of each of the one or plurality of lenses 190 from the baseline position by the mass of each of the one or plurality of lenses 190 to obtain respective physical quantities, then dividing the sum total of these physical quantities by the mass of the moving member 300.

The physical structure 210 can move the one or plurality of lenses 170 in the optical axis direction, and can also move the moving member 200 in the opposite direction from the movement direction of the center of gravity of the physical system that includes the one or plurality of lenses 170. The physical structure 210 is one example of a second physical structure. The physical structure 210 can move the moving member 200 in the opposite direction from the movement direction of the center of gravity of the physical system that further includes the light amount adjustment mechanism 180. The physical structure 210 moves the moving member 200 such that a component of the opposite direction from the movement direction of the center of gravity of the physical system that includes the one or plurality of lenses 170 is at least included in the movement direction of the moving member 200.

The physical structure 210 can be physically linked with the moving member 200 and the lens holding members 230. For example, when the moving member 200 moves in one optical axis direction, the physical structure 210 can move the lens holding members 230 in the other optical axis direction. The physical structure 210 can physically transmit to the lens holding members 230 a force generated by the moving member 200 rotating and moving in one optical axis direction, and can move the lens holding members 230 in the other optical axis direction.

The physical structure 210 can include a cam portion and a follower portion. The cam portion of the physical structure 210 is one example of a second cam portion. The follower portion of the physical structure 210 is one example of a second follower portion. The cam portion of the physical structure 210 can be provided to one of the moving member 200 and the lens holding members 230. The follower portion of the physical structure 210 can be provided to the other of the moving member 200 and the lens holding members 230. The force generated by the moving member 200 rotating and moving in one optical axis direction can be physically transmitted to the lens holding members 230 via the cam portion and the follower portion. The follower portion of the physical structure 210 can move along a cam surface of the cam portion and thereby cause the lens holding members 230 and the moving member 200 to move relative to each other.

The physical structure 310 can move the one or plurality of lenses 190 in the optical axis direction, and can also move the moving member 300 in the opposite direction from the movement direction of the center of gravity of the physical system that includes the one or plurality of lenses 190. The physical structure 310 is one example of a first physical structure. The physical structure 310 moves the moving member 300 such that a component of the opposite direction from the movement direction of the center of gravity of the physical system that includes the one or plurality of lenses 190 is at least included in the movement direction of the moving member 300.

The physical structure 310 can be physically linked with the moving member 300 and the lens holding members 330. For example, when the moving member 300 moves in one optical axis direction, the physical structure 310 can move the lens holding members 330 in the other optical axis direction. The physical structure 310 can physically transmit to the lens holding members 330 a force generated by the moving member 300 rotating and moving in one optical axis direction, and can move the lens holding members 330 in the other optical axis direction.

The physical structure 310 can include a cam portion and a follower portion. The cam portion of the physical structure 310 is one example of a first cam portion. The follower portion of the physical structure 310 is one example of a first follower portion. The cam portion of the physical structure 310 can be provided to one of the moving member 300 and the lens holding members 330. The follower portion of the physical structure 310 can be provided to the other of the moving member 300 and the lens holding members 330. The force generated by the moving member 300 rotating and moving in one optical axis direction can be physically transmitted to the lens holding members 330 via the cam portion and the follower portion. The follower portion of the physical structure 310 can move along the cam surface of the cam portion and thereby cause the lens holding members 330 and the moving member 300 to move relative to each other.

With the configuration described above, the moving member 200 can, via the physical structure 210, move in a direction that inhibits a change in the position of the center of gravity of the lens device 160 that is associated with the movement of the one or plurality of lenses 170. By inhibiting a change in the position of the center of gravity of the lens device 160 associated with the zoom action of the lens device 160, a change in drive torque on the pitch axis of the gimbal 110 associated with the zoom action of the lens device 160 can be inhibited. Furthermore, the moving member 300 can, via the physical structure 310, move in a direction that inhibits a change in the position of the center of gravity of the lens device 160 that is associated with the movement of the one or plurality of lenses 190. By inhibiting a change in the position of the center of gravity of the lens device 160 associated with the focus action of the lens device 160, a change in drive torque on the pitch axis of the gimbal 110 associated with the focus action of the lens device 160 can be inhibited. Moreover, a change in the position of the center of gravity of the entire UAV 100 associated with the zoom action and/or the focus action of the lens device 160 can be inhibited, and the UAV 100 is able to achieve more stable flight.

Figure 3:
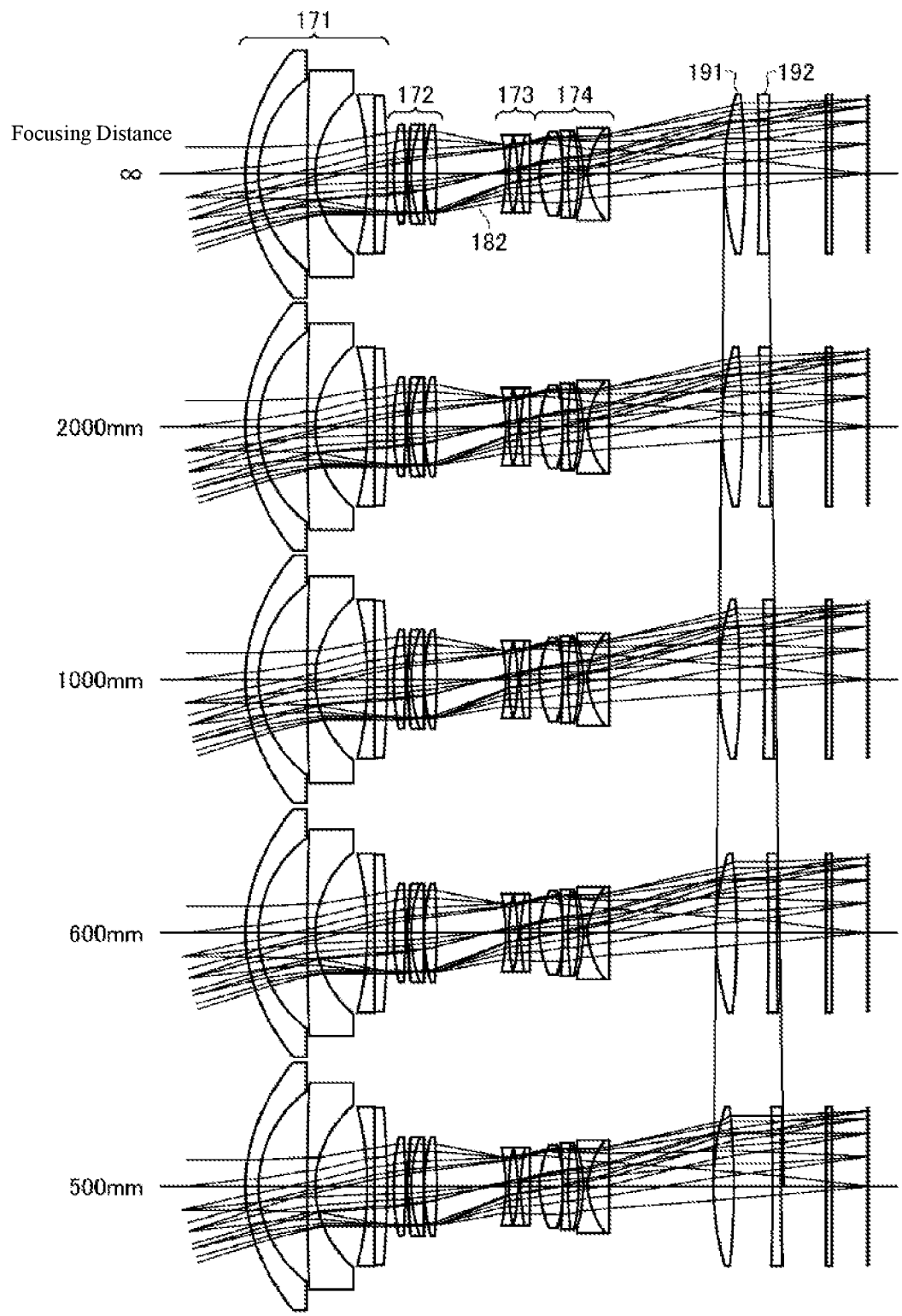
FIG. 3 illustrates examples of movement in a focus lens system in response to various focusing distances.

FIG. 3 illustrates examples of movement in a focus lens system in response to various focusing distances. The lens device 160 can include, in order from the body side, a first lens group 171, a second lens group 172, a third lens group 173, a fourth lens group 174, a first focus lens 191, and a second focus lens 192. Each of the plurality of lenses 170 can be classified as belonging to one of the first lens group 171, the second lens group 172, the third lens group 173, and the fourth lens group 174. Each of the plurality of lenses 190 can be classified as one of the first focus lens 191 and the second focus lens 192. FIG. 3 illustrates examples of the positions of the respective lens groups in cases where the zoom lens system is in a telephoto position and the focusing distance is co, 2000 mm, 1000 mm, 600 mm, and 500 mm. The "telephoto position" refers to the positions of each lens group in the zoom lens system at the telephoto end of the lens device 160. The lenses of the first lens group 171 do not move in the optical axis direction. The lenses of the second lens group 172, the third lens group 173, and the fourth lens group 174 can move in the optical axis direction. An aperture 182 can be disposed between the second lens group 172 and the third lens group 173. The aperture 182 can move in the optical axis direction in conjunction with the movement of the third lens group 173. The first focus lens 191 and the second focus lens 192 can move in the optical axis direction, to conform with the movement associated with the zoom action of the second lens group 172, the third lens group 173, and the fourth lens group 174 in the optical axis direction. Furthermore, the first focus lens 191 and the second focus lens 192 can move in the optical axis direction as part of the focus action, independently of the movement of the second lens group 172, the third lens group 173, and the fourth lens group 174 in the optical axis direction.

Figure 4:
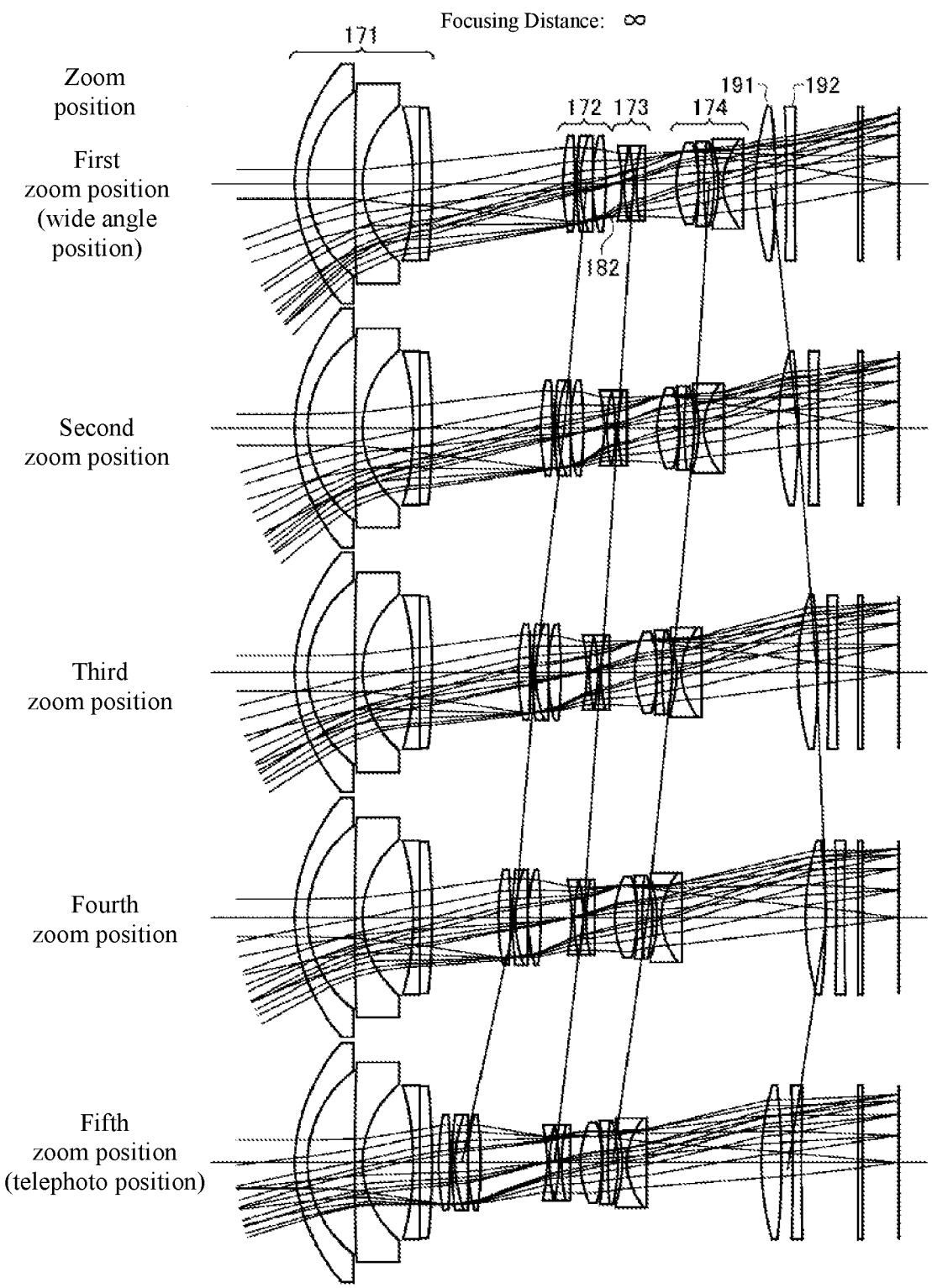
FIG. 4 illustrates examples of movement in the focus lens system in response to various zoom positions.

FIG. 4 illustrates examples of the movement of the lenses in each of the zoom lens system and the focus lens system in cases where the focusing distance is co, and the zoom lens system moves from a wide angle position to the telephoto position. The "wide angle position" refers to the positions of each lens group in the zoom lens system at the wide angle end of the lens device 160. As illustrated in FIG. 4, the focus lens system moves in the optical axis direction in conjunction with the movement of the zoom lens system from the wide angle position to the telephoto position. Accordingly, any aberrations associated with the movement of the zoom lens system can be corrected.

Figure 5:
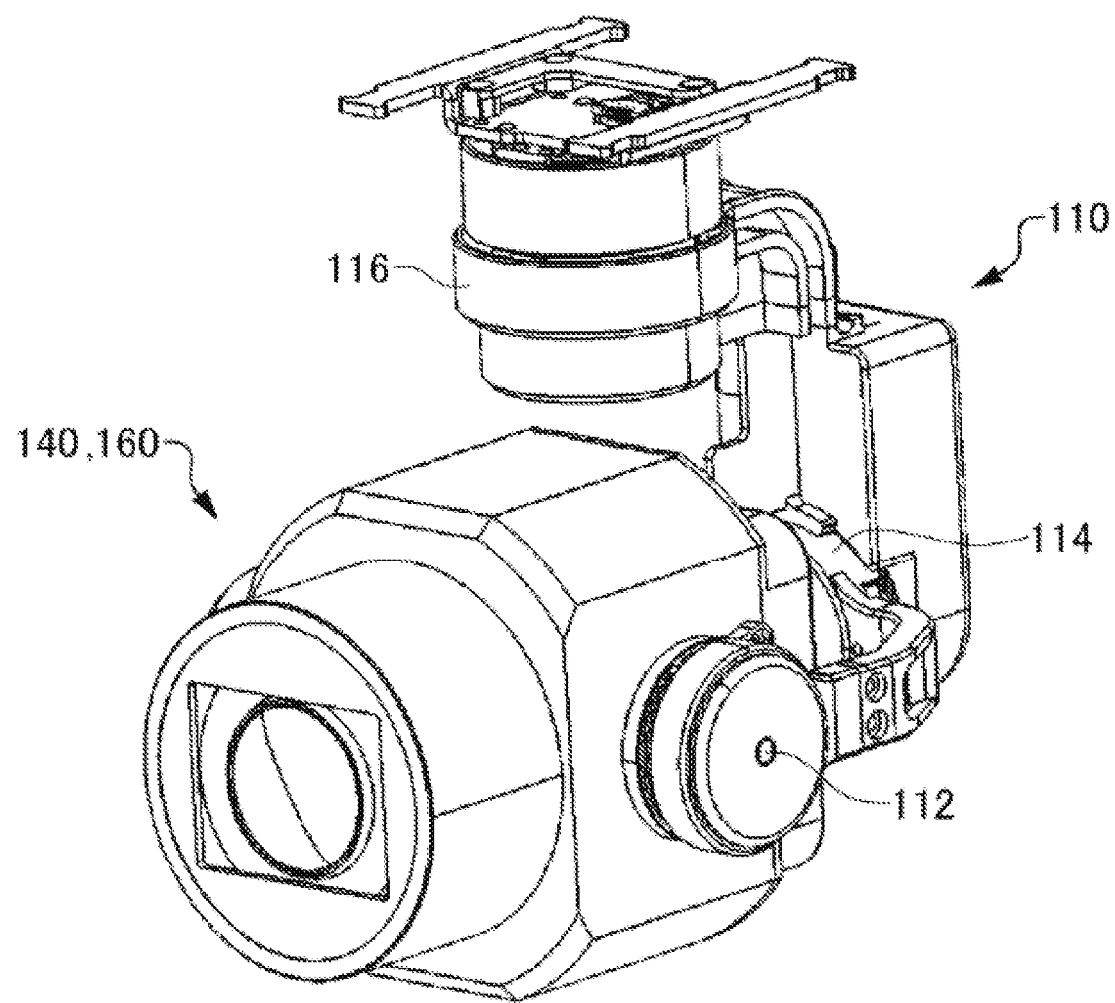
FIG. 5 is a perspective view of an exemplary exterior of an imaging device and lens device.
Figure 6:
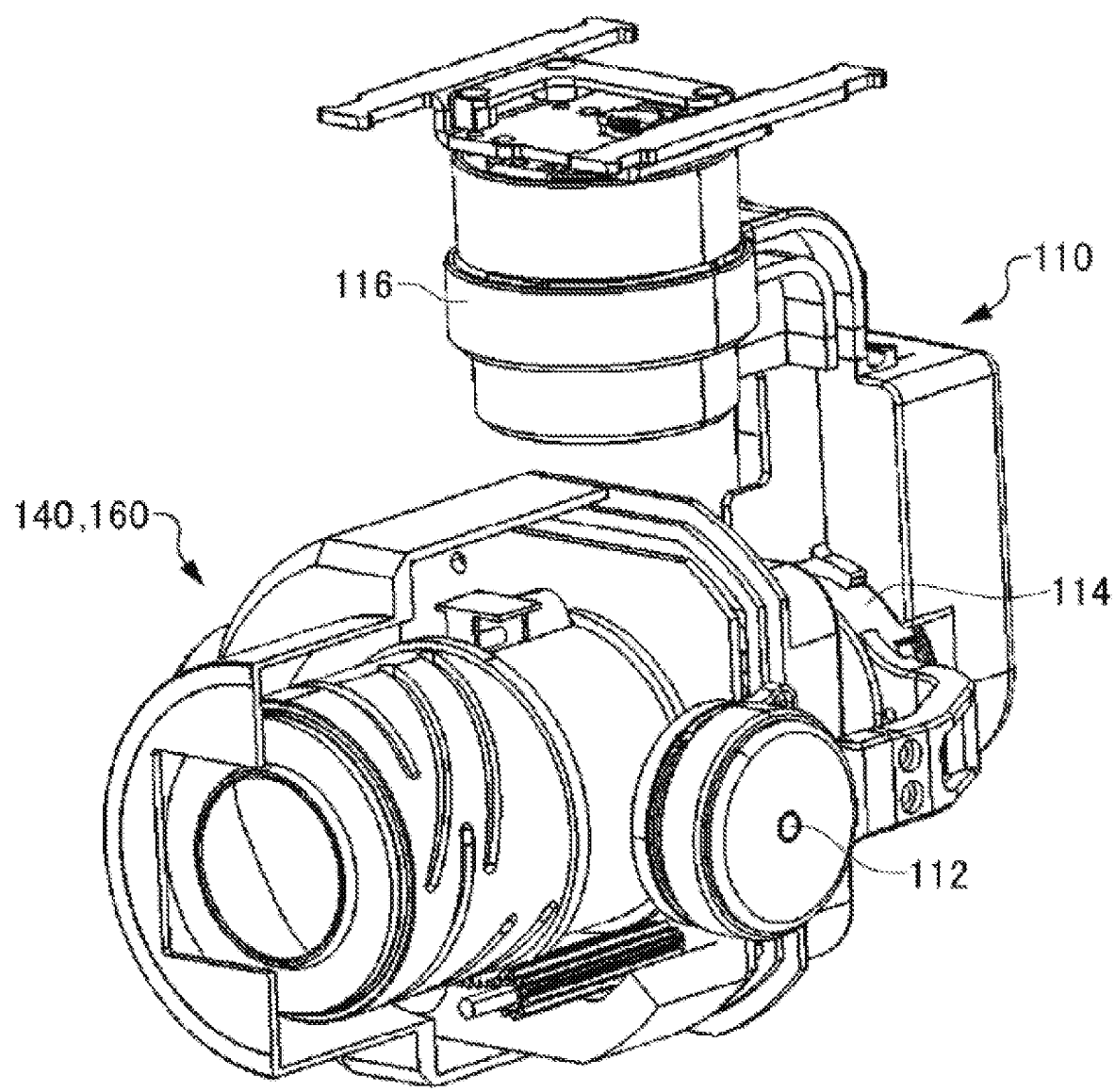
FIG. 6 is a perspective view of an exemplary interior appearance of an imaging device and lens device housing.

FIG. 5 is a perspective view of an exemplary exterior of the imaging device 140 and the lens device 160 supported on the gimbal 110. FIG. 6 is a perspective view of an exemplary interior appearance of the housing of the imaging device 140 and the lens device 160 supported on the gimbal 110. The gimbal 110 can include a pitch axis rotation mechanism 112 that rotates the imaging device 140 and the lens device 160 centered on the pitch axis. The gimbal 110 can further include a roll axis rotation mechanism 114 and a yaw axis rotation mechanism 116 rotating the imaging device 140 and the lens device 160 centered on the roll axis and the yaw axis, respectively.

Figure 7:
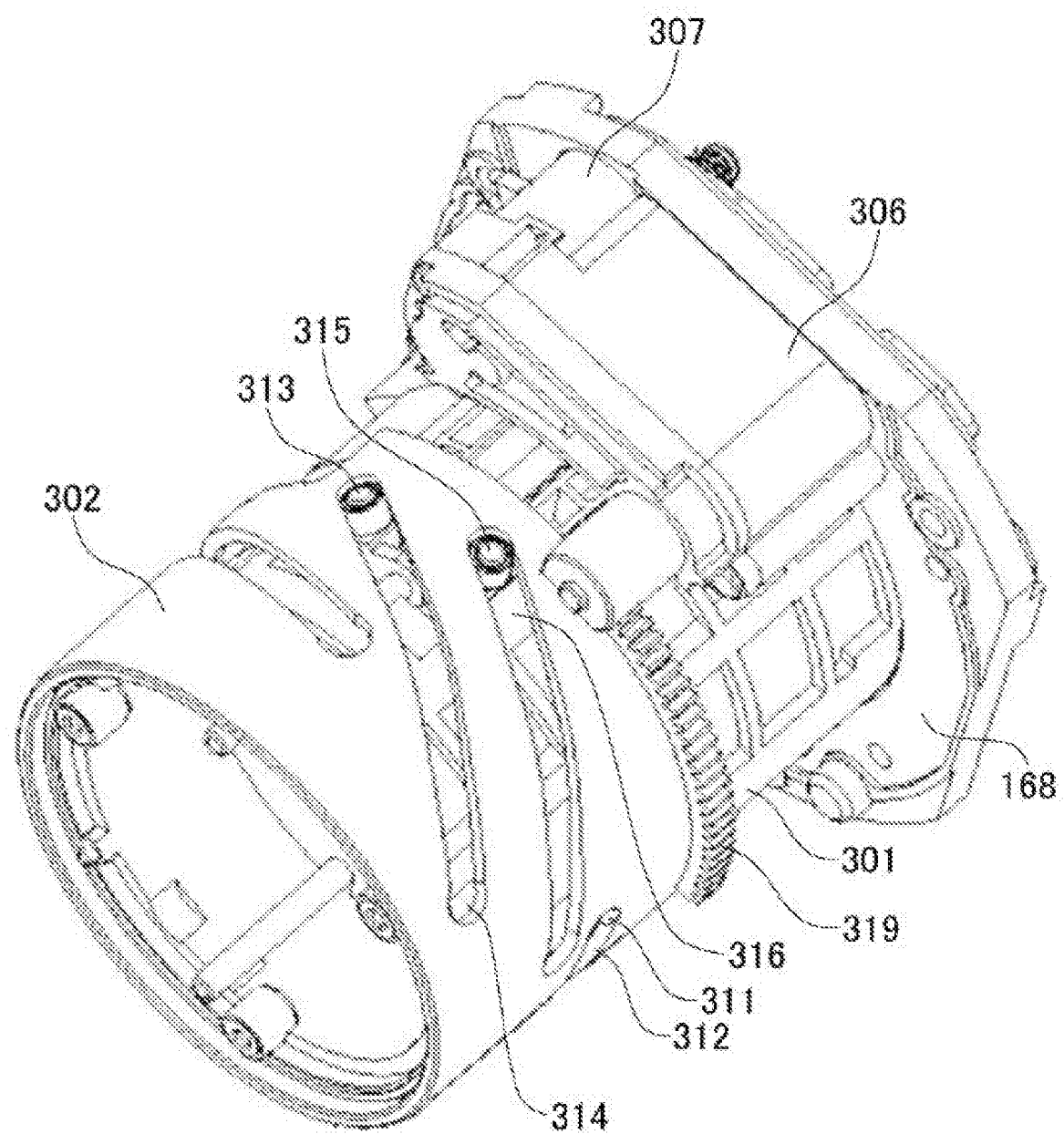
FIG. 7 illustrates an exemplary perspective view of a cam ring in the focus lens system.
Figure 8:
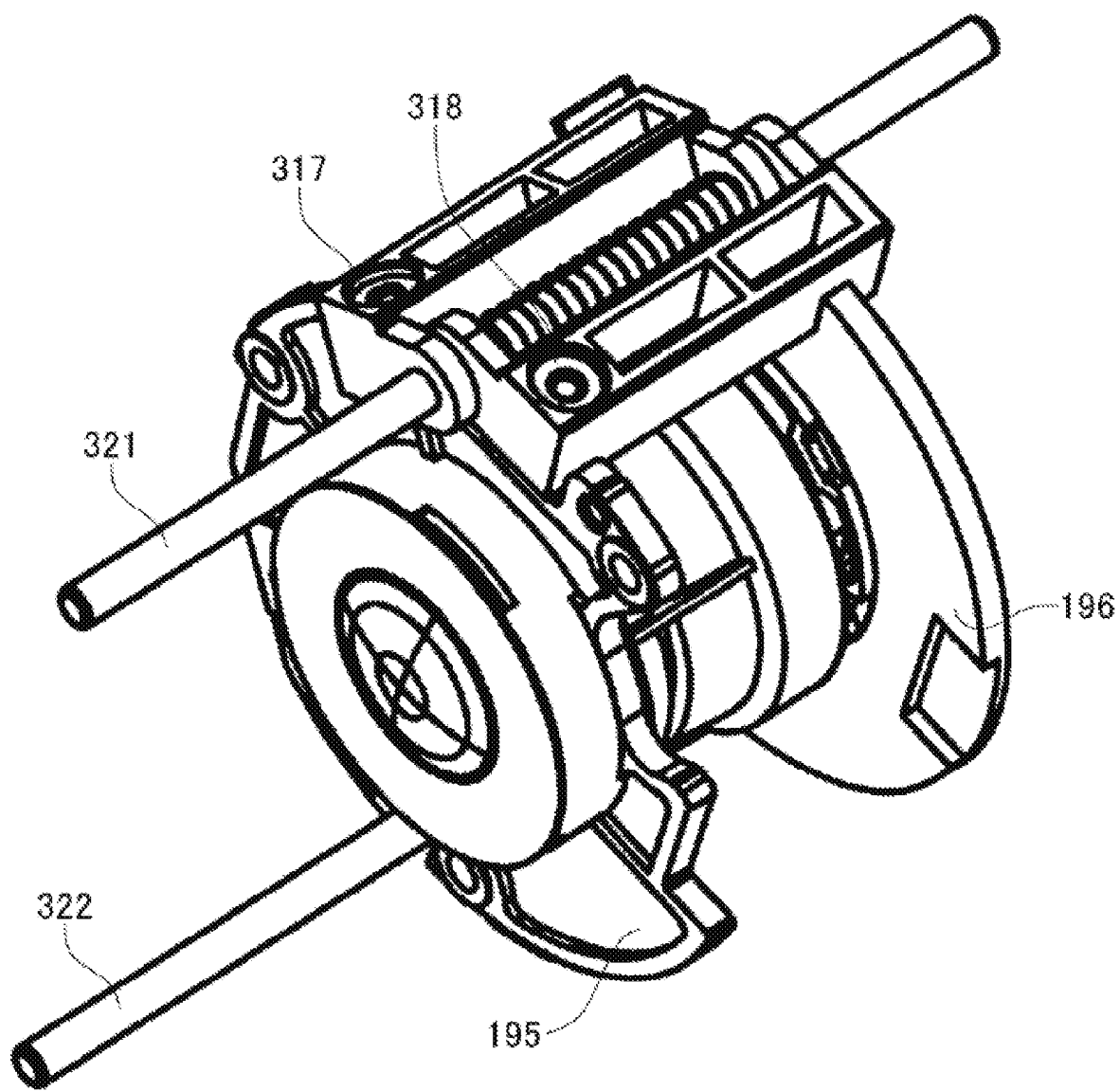
FIG. 8 illustrates an exemplary perspective view of a displacement mechanism in the focus lens system.

FIG. 7 illustrates an exemplary perspective view of an exterior of a cam ring 302 in the focus lens system. FIG. 8 illustrates an exemplary perspective view of an exterior of a displacement mechanism in the focus lens system. A fixed cylinder 301 can be fixed to a base 168, which is provided with an electric circuit such as the imaging element 144. The first focus lens 191 and the second focus lens 192 are disposed inside the fixed cylinder 301. The first focus lens 191 is fixed to a first focus lens holding member 195. The second focus lens 192 is fixed to a second focus lens holding member 196. The cam ring 302 is disposed on an outer circumferential side of the fixed cylinder 301, and is disposed so as to be rotatable and movable in the optical axis direction. A gear 319 is formed on a portion of the outer circumference on one end of the cam ring 302. Power from a drive motor 307 can be transmitted to the gear 319 via a gear mechanism 306, rotating the cam ring 302.

A cam ring-operating cam groove 312, a first focus lens-operating cam groove 314, and a second focus lens-operating cam groove 316 can be formed on the cam ring 302. A cam ring-operating cam pin 311 is provided on the outer circumference of the fixed cylinder 301 at a position corresponding to the cam ring-operating cam groove 312. The cam ring-operating cam groove 312 cooperates with the cam ring-operating cam pin 311 and can guide the movement of the cam ring 302 in the optical axis direction. A first focus lens-operating cam pin 313 is provided to the lens holding member 195. The first focus lens-operating cam groove 314 cooperates with the first focus lens-operating cam pin 313 and can guide the movement of the first focus lens 191 in the optical axis direction. A second focus lens-operating cam pin 315 is provided to the lens holding member 196. The second focus lens-operating cam groove 316 cooperates with the second focus lens-operating cam pin 315 and can guide the movement of the second focus lens 192 in the optical axis direction.

As illustrated in FIG. 8, a guide support 321 and guide support 322 that extend parallel to the optical axis direction can be provided inside the cam ring 302. The guide support 321 and the guide support 322 can be fixed to the base 168. The lens holding member 195 and the lens holding member 196 can be guided by the guide support 321 and the guide support 322 to move in the optical axis direction. The first focus lens-operating cam pin 313 can be provided to a hole 317 provided in the lens holding member 195. The second focus lens-operating cam pin 315 can be provided to a hole 318 provided in the lens holding member 196.

The first focus lens-operating cam pin 313 can move within the first focus lens-operating cam groove 314 in association with the cam ring 302 rotating and moving in the optical axis direction. This movement of the first focus lens-operating cam pin 313 can cause the first focus lens 191 to move in the optical axis direction. The second focus lens-operating cam pin 315 can move within the second focus lens-operating cam groove 316 in association with the cam ring 302 rotating and moving in the optical axis direction. This movement of the second focus lens-operating cam pin 315 can cause the second focus lens 192 to move in the optical axis direction.

The cam ring 302 is one example of the moving member 300. One example of the first cam portion can include the cam ring-operating cam groove 312, the first focus lens-operating cam groove 314, and the second focus lens-operating cam groove 316. One example of the cam surface of the first cam portion can include side surfaces of each of the cam ring-operating cam groove 312, the first focus lens-operating cam groove 314, and the second focus lens-operating cam groove 316. One example of the first follower portion can include the cam ring-operating cam pin 311, the first focus lens-operating cam pin 313, and the second focus lens-operating cam pin 315.

The cam ring 302 can move in the opposite direction from the movement direction of the center of gravity of the physical system that includes the first focus lens 191 and the second focus lens 192. This movement of the cam ring 302 can inhibit a change in the position of the center of gravity of the lens device 160 associated with the movement of the focus lens system accompanying the focus action and/or the zoom action.

Figure 9:
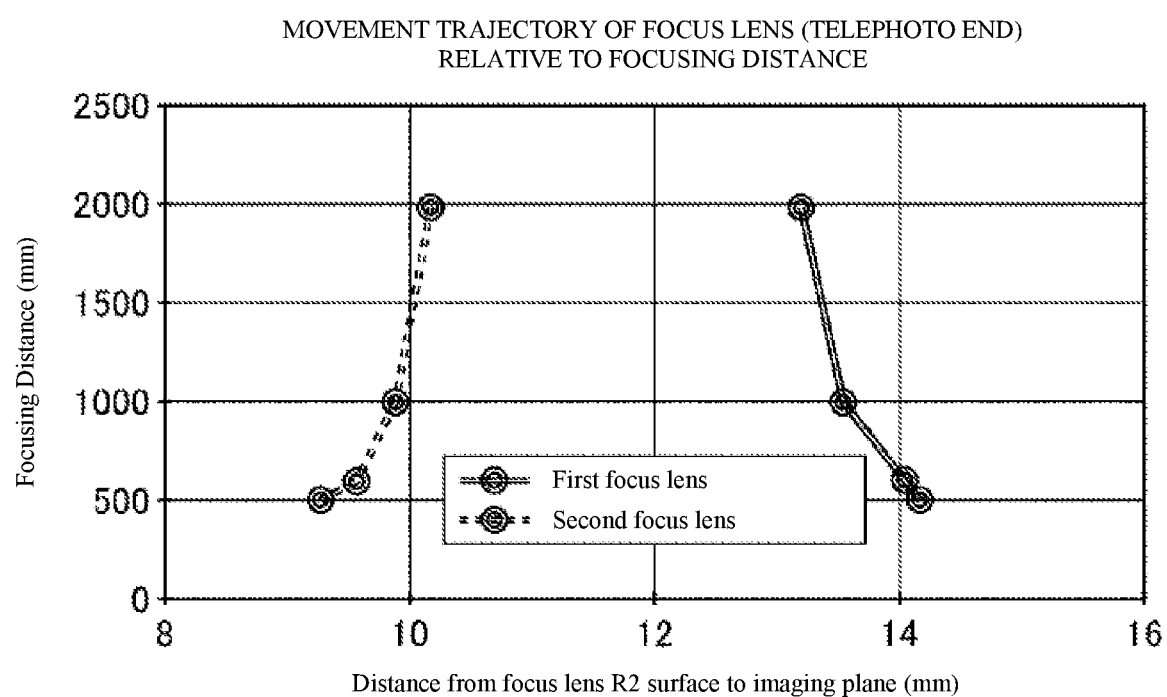
FIG. 9 illustrates one example of a movement trajectory of a focus lens relative to focusing distance.

FIG. 9 illustrates one example of a movement trajectory of the focus lens system relative to the focusing distance. FIG. 9 illustrates a movement trajectory of the focus lenses when the focusing distance is changed at the telephoto end of the lens device 160. When the focusing distance changes from 500 mm and approaches 2000 mm, the first focus lens 191 approaches an image plane and the second focus lens 192 moves away from the image plane. The term "focus lens R2 surface" indicates a surface of a focus lens that is on the same side of the focus lens as the image plane.

Figure 10:
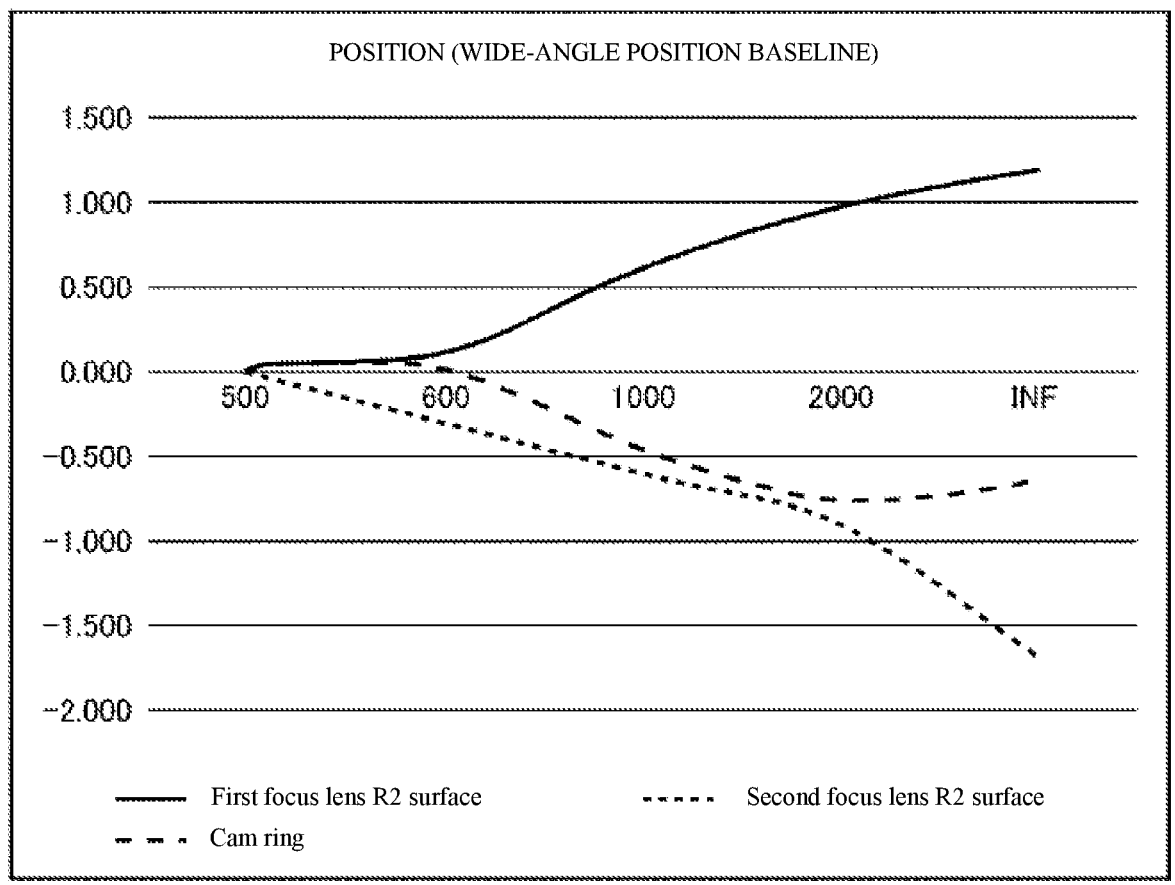
FIG. 10 illustrates one example of a relationship between the focusing distance and a distance from a baseline position of the focus lens system in a wide angle position.

FIG. 10 illustrates one example of a relationship between the focusing distance and the distance from the baseline position of the focus lens system in the wide angle position. In FIG. 10, the baseline position refers to the positions of the first focus lens 191, the second focus lens 192, and the cam ring 302 when the focusing distance is 500 mm. The distance from the baseline position uses a positive value to express a position closer to the image plane and a negative value to express a position closer to the body. The cam ring 302 can move in the opposite direction from the movement direction of the center of gravity of the physical system that includes the first focus lens 191 and the second focus lens 192. In the example illustrated in FIG. 10, when the focusing distance changes from 500 mm and approaches ∞, the cam ring 302 moves so as to first approach the image plane, then move away from the image plane, and then approach the image plane once again. When the cam ring 302 moves in this way, a change in the position of the center of gravity of the lens device 106 accompanying the focus action can be inhibited. The movement trajectory illustrated in FIG. 10 is merely exemplary, and the movement trajectory of the cam ring 302 may differ in response to the mass or movement trajectory of each focus lens.

Figure 11:
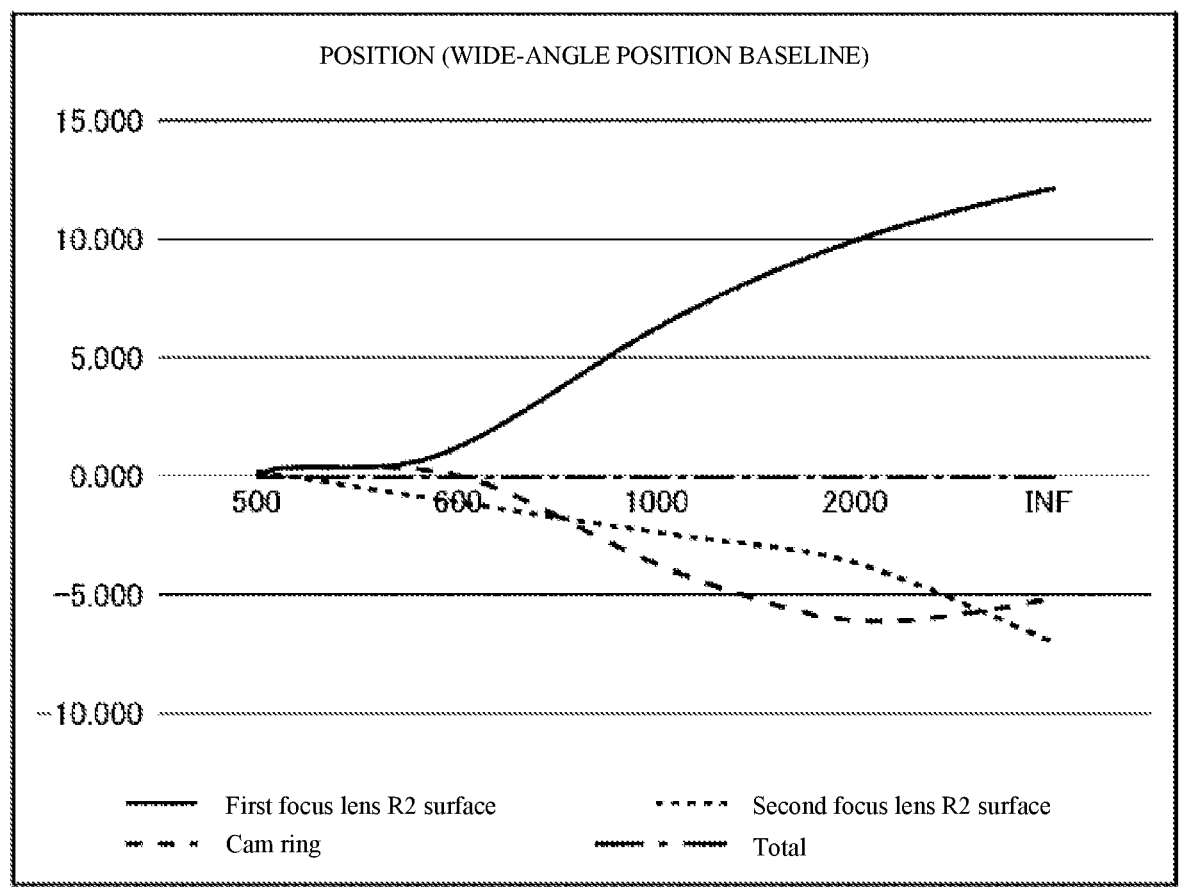
FIG. 11 illustrates one example of a relationship between the focusing distance and a physical quantity obtained by multiplying mass by the distance from the baseline position of the focus lens system in the wide angle position.

FIG. 11 illustrates one example of a relationship between the focusing distance and a physical quantity (moment) (g·mm) obtained by multiplying mass by the distance from the baseline position of the focus lens system in the wide angle position. FIG. 12 illustrates one example of a relationship between the distance from the baseline position of the focus lens system in the wide angle position, the focusing distance, and the physical quantity (moment) (g·mm) obtained by multiplying mass by the distance from the baseline position. As in FIG. 10, the baseline position refers to the positions of the first focus lens 191, the second focus lens 192, and the cam ring 302 when the focusing distance is 500 mm.

Hereafter, the physical quantity obtained by multiplying mass by the distance from the baseline position is referred to as a physical quantity Bx. The cam ring 302 can move in a direction that inhibits a change in the position of the center of gravity of the physical system that includes the first focus lens 191 and the second focus lens 192. The distance of the cam ring 302 from the baseline position can be set such that a calculated value is no more than a predetermined value. The calculated value can be obtained by adding a physical quantity B1 of the first focus lens to a physical quantity B2 of the second focus lens, then dividing the sum total of these physical quantities by the mass of the cam ring 302. This distance can inhibit a change in the position of the center of gravity of the physical system (sum total) that includes the first focus lens 191, the second focus lens 192, and the cam ring 302 accompanying a change in the focusing distance. The distance of the cam ring 302 from the baseline position can also be set such that a calculated value is canceled out. The calculated value can be obtained by adding the physical quantity B1 of the first focus lens 191 to the physical quantity B2 of the second focus lens 192, then dividing the sum total of these physical quantities by the mass of the cam ring 302. This distance can prevent a change in the position of the center of gravity of the physical system due to a change in the focusing distance. A change in the position of the center of gravity associated with the movement of the first focus lens 191 and the second focus lens 192 accompanying the focus action and/or the zoom action can be inhibited.

The sum total of the physical quantity B1 of the first focus lens 191, the physical quantity B2 of the second focus lens 192, and a physical quantity BC of the cam ring 302 can be expressed as the sum total ΣB of a physical quantity Bx. In the examples illustrated in FIGS. 10 to 12, the cam ring 302 can move such that the sum total ΣB of a physical quantity Bx is always zero while the focusing distance is changed from the shortest distance (e.g., 500 mm) to the longest distance (e.g., ∞). However, the cam ring 302 does not necessarily need to move such that the sum total ΣB of a physical quantity Bx is always zero. This is because a drive range of the grooves in the cam ring 302 is restricted by, for example, a design restriction or the like. In such a case, the cam ring 302 can move such that, for example, the maximum value of the sum total ΣB of a physical quantity Bx for a case where the focusing distance is changed from the shortest distance to the longest distance is no more than one-third that of a case where the cam ring 302 does not restrict a change in the position of the center of gravity.

The cam ring 302 can move such that a width W of the change in position of the center of gravity of the lens device 160 when the focusing distance is changed from the shortest distance to the longest distance is less than 10% that of a case where the cam ring 302 does not restrict the change in the position of the center of gravity. In order to keep the optical axis of the lens device 160 horizontal, drive torque must be applied on the pitch axis of the gimbal 110. This drive torque is expressed as C (N·mm). Given this, the cam ring 302 can move such that the maximum value of the drive torque C when the focusing distance is changed from the shortest distance to the longest distance is less than 10% that of a case where the cam ring 302 does not restrict the change in the position of the center of gravity.

As described above, a change in the position of the center of gravity of the lens device 160 associated with the movement of the focus lens system can be inhibited due to the movement of the cam ring 302 in the optical axis direction.

Figure 13:
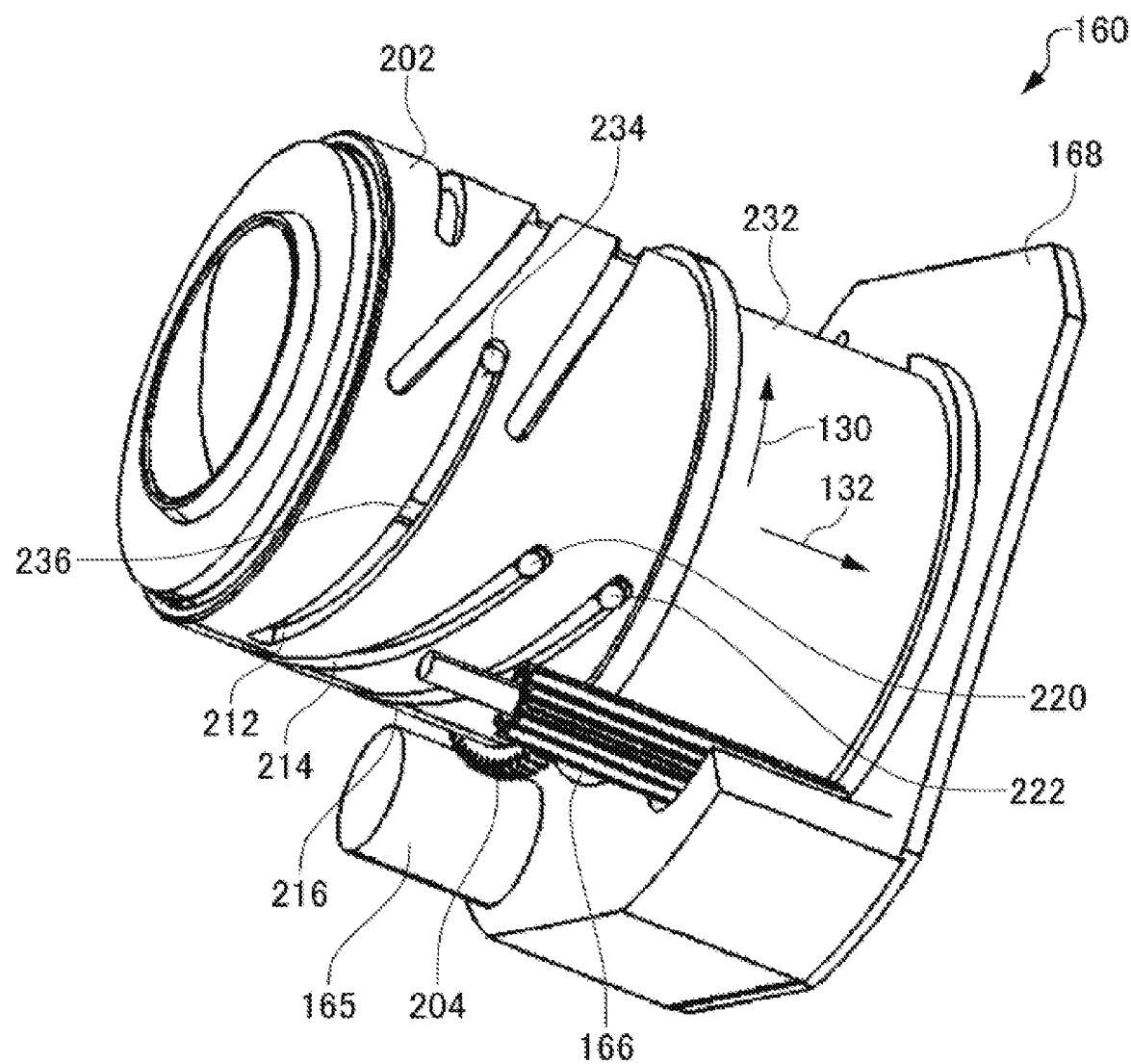
FIG. 13 illustrates an exemplary perspective view of a cam ring of a zoom lens system.
Figure 14:
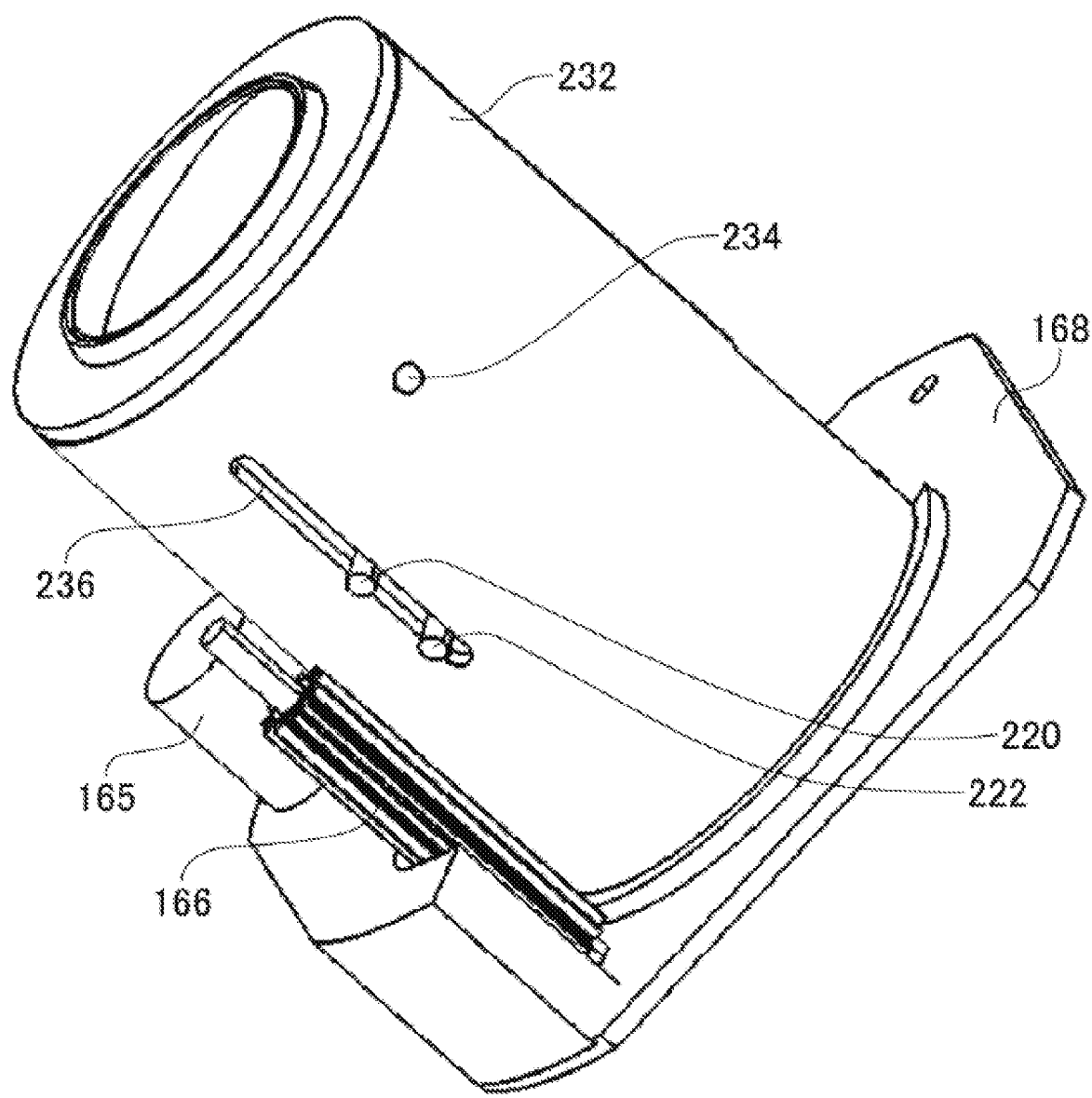
FIG. 14 illustrates an exemplary perspective view of a fixed cylinder.

FIG. 13 illustrates an exemplary perspective view of an exterior of a cam ring 202 of the zoom lens system. FIG. 14 illustrates an exemplary perspective view of an exterior of a fixed cylinder 232. The fixed cylinder 232 can be fixed to the base 168, which is provided with an electric circuit such as the imaging element 144. The fixed cylinder 232 holds a lens of the first lens group 171. The cam ring 202 is disposed on an outer circumferential side of the fixed cylinder 232, and is disposed so as to be rotatable and movable in the optical axis direction. A gear 204 is formed on a portion of the outer circumference on one end of the cam ring 202. The gear 204 can interlock with a gear 166. The gear 166 can be rotated by the drive motor 165. Power from the drive motor 165 can be transmitted to the gear 204 via the gear 166 and, while rotating, the cam ring 202 can move in the optical axis direction along the outer circumference of the fixed cylinder 232.

As illustrated in FIG. 14, a cam ring support pin 234 can be provided to the outer circumferential surface of the fixed cylinder 232. The cam ring support pin 234 can guide the movement of the cam ring 202 in the optical axis direction. A linear guide groove 236 can be formed on the fixed cylinder 232. The linear guide groove 236 can guide the optical-axis-direction movement of a second lens group cam pin 220, a third lens group cam pin 222, and a fourth lens group cam pin (not shown in the drawings). The second lens group cam pin 220 is provided to the lens holding members 230 that hold the lenses 170 of the second lens group 172. The third lens group cam pin 222 is provided to the lens holding members 230 that hold the lenses 170 of the third lens group 173. The fourth lens group cam pin is provided to the lens holding members 230 that hold the lenses 170 of the fourth lens group 174.

As illustrated in FIG. 13, a cam ring-operating cam groove 212 that engages with the cam ring support pin 234 can be formed on the cam ring 202. The cam ring-operating cam groove 212 is guided by the cam ring support pin 234, and thereby the cam ring 202 can move in the optical axis direction while rotating. For example, the cam ring 202 can move in the direction of an arrow 132 while rotating in the direction of an arrow 130. Furthermore, a second lens group-operating cam groove 214 that engages with the second lens group cam pin 220, a third lens group-operating cam groove 216 that engages with the third lens group cam pin 222, and a fourth lens group-operating cam groove (not shown in the drawings) that engages with the fourth lens group cam pin can be formed on the cam ring 202. The second lens group cam pin 220 can move within the linear guide groove 236 and along the second lens group-operating cam groove 214 in association with the cam ring 202 rotating and moving in the optical axis direction. This movement of the second lens group cam pin 220 can cause the lenses in the second lens group 172 to move in the optical axis direction. The third lens group cam pin 222 can move within the linear guide groove 236 and along the third lens group-operating cam groove 216 in association with the cam ring 202 rotating and moving in the optical axis direction. This movement of the third lens group cam pin 222 can cause the lenses in the third lens group 173 to move in the optical axis direction. The fourth lens group cam pin can move within the linear guide groove 236 and along the fourth lens group-operating cam groove in association with the cam ring 202 rotating and moving in the optical axis direction. This movement of the fourth lens group cam pin can cause the lenses in the fourth lens group 174 to move in the optical axis direction.

The cam ring 202 is one example of the moving member 200. One example of the second cam portion can include the linear guide groove 236, the cam ring-operating cam groove 212, the second lens group-operating cam groove 214, the third lens group-operating cam groove 216, and the fourth lens group-operating cam groove. One example of the cam surface of the second cam portion can include side surfaces of each of the linear guide groove 236, the cam ring-operating cam groove 212, the second lens group-operating cam groove 214, the third lens group-operating cam groove 216, and the fourth lens group-operating cam groove. One example of the second follower portion can include the cam ring support pin 234, the second lens group cam pin 220, the third lens group cam pin 222, and the fourth lens group cam pin.

The cam ring 202 can move in the opposite direction from the movement direction of the center of gravity of the physical system that includes the lenses of the second lens group 172, the lenses of the third lens group 173, and the lenses of the fourth lens group 174. Moreover, the cam ring 202 can move in the opposite direction from the movement direction of the center of gravity of the physical system that includes the lenses of the second lens group 172, the lenses of the third lens group 173, and the lenses of the fourth lens group 174, and that also includes the light amount adjustment mechanism 180 including the aperture 182 and the actuator. This movement of the cam ring 202 can inhibit a change in the position of the center of gravity of the lens device 160 associated with the zoom action.

Figure 15:
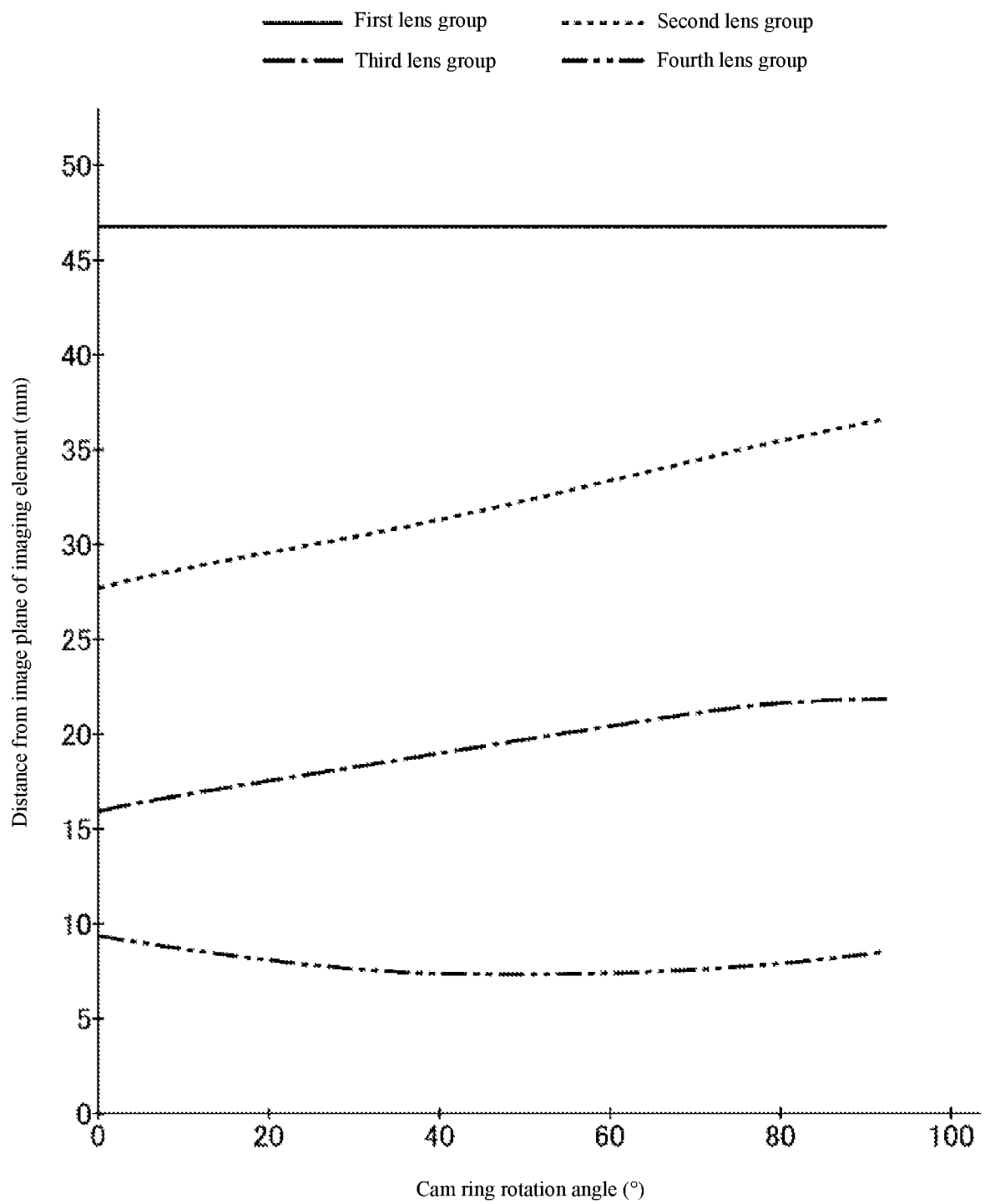
FIG. 15 illustrates one example of a relationship between a rotation angle of the cam ring of the zoom lens system and a distance from an image plane of an imaging element.

FIG. 15 illustrates one example of a relationship between a rotation angle of the cam ring and a distance from the image plane of the imaging element 144. The cam ring rotation angle is a rotation angle of the cam ring 202 from a baseline angle, where the rotation angle of the cam ring 202 at the wide angle end of the lens device 160 is treated as the baseline angle (0°). The distance from the image plane of the imaging element 144 is a distance from the image plane of the imaging element 144 to each lens group in the zoom lens system. FIG. 15 depicts a change in the distance from the image plane of the imaging element 144 to each lens group in the zoom lens system in a case where the lens device 160 is changed from the wide angle end to the telephoto end.

Figure 16:
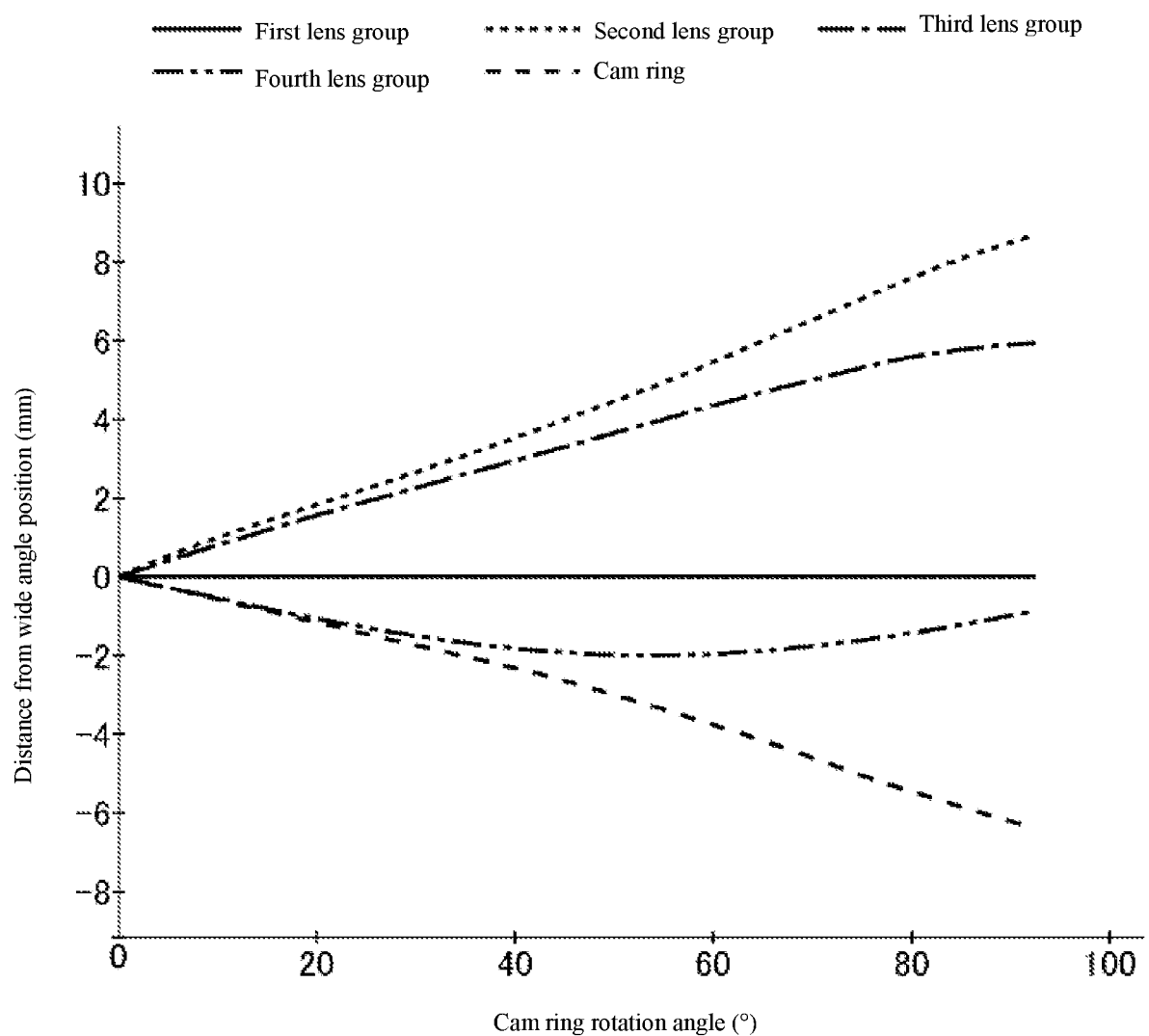
FIG. 16 illustrates one example of a relationship between the rotation angle of the cam ring of the zoom lens system and a distance from the wide angle position.

FIG. 16 illustrates one example of a relationship between the rotation angle of the cam ring and a distance from the wide angle position. The "wide angle position" refers to the positions of the cam ring 202 and of each lens group in the zoom lens system at the wide angle end of the lens device 160. FIG. 16 depicts a change in the distance from the wide angle position for the cam ring 202 and for each lens group in the zoom lens system in a case where the lens device 160 is changed from the wide angle end to the telephoto end.

Figure 17:
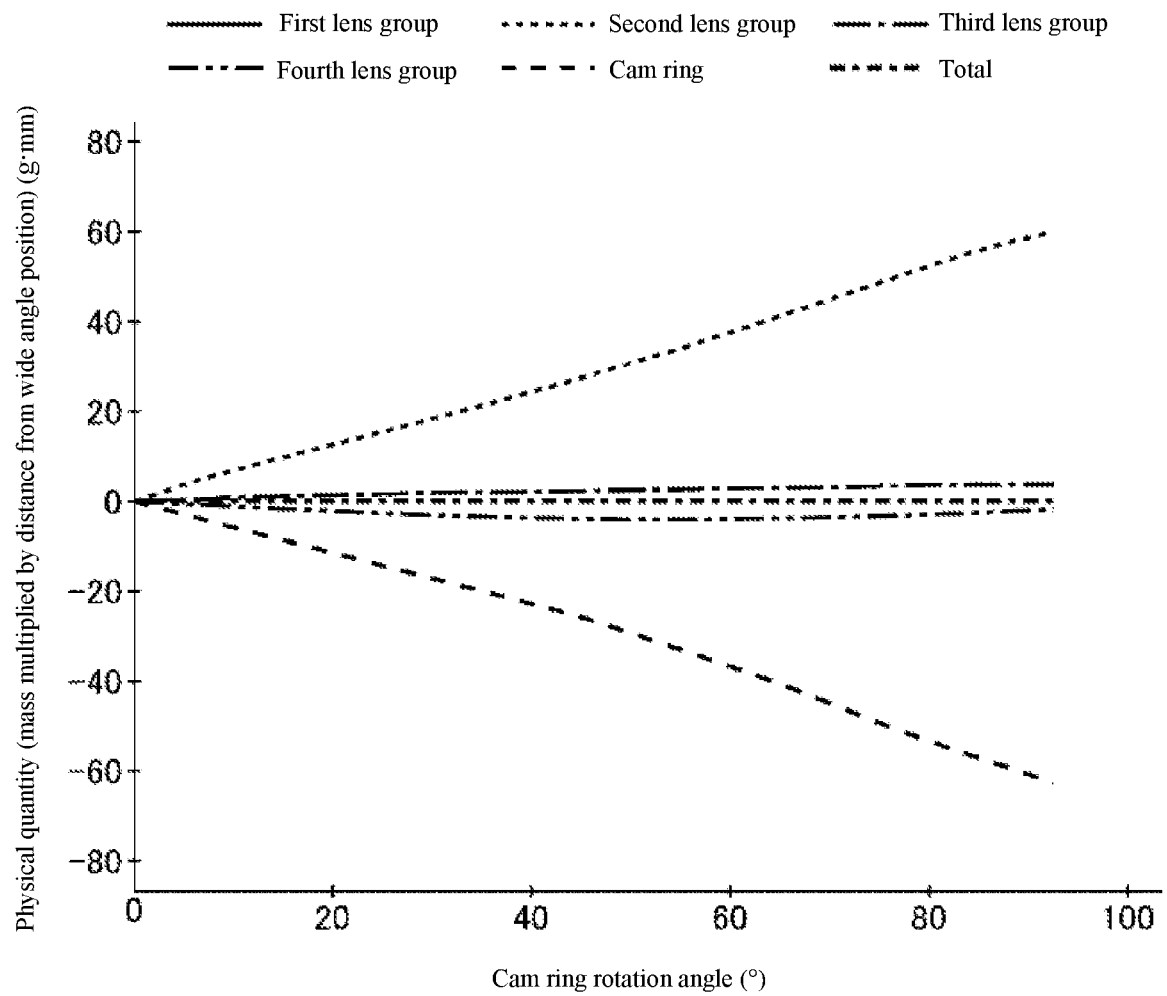
FIG. 17 illustrates one example of a relationship between the rotation angle of the cam ring of the zoom lens system and a physical quantity obtained by multiplying mass by the distance from the wide angle position.

FIG. 17 illustrates one example of a relationship between the rotation angle of the cam ring and a physical quantity (g·mm) obtained by multiplying mass by the distance from the wide angle position. Hereafter, the physical quantity obtained by multiplying mass by the distance from the wide angle position is referred to as a physical quantity Ax. The cam ring 202 can move in a direction that inhibits changes in the position of the center of gravity of the physical system that includes the second lens group 172, the third lens group 173, and the fourth focus lens 174. The distance of the cam ring 202 from the wide angle position can be set such that a calculated value is no more than a predetermined value. The calculated value can be obtained by adding a physical quantity A2 of the second lens group 172 to a physical quantity A3 of the third lens group 173 and a physical quantity A4 of the fourth lens group 174, then dividing the sum total of these physical quantities by the mass of the cam ring 202. This distance can inhibit the position of the center of gravity of the physical system (sum total) that includes the first lens group 171, the second lens group 172, the third lens group 173, the fourth lens group 174, and the cam ring 202 from changing from the wide angle end of the lens device 160 to the telephoto end. The distance of the cam ring 202 from the wide angle position can be set such that a calculated value is canceled out. The calculated value can be obtained by adding the physical quantity A2 of the second lens group 172 to the physical quantity A3 of the third lens group 173 and the physical quantity A4 of the fourth lens group 174, then dividing the sum total of these physical quantities by the mass of the cam ring 202. This distance can prevent a change in the position of the center of gravity of the physical system from the wide angle end to the telephoto end. The mass of the third lens group 173, which is a parameter of the physical quantity A3 of the third lens group 173, can include the mass of the aperture 182.

The sum total of the physical quantity A1 of the first lens group 171, the physical quantity A2 of the second lens group 172, the physical quantity A3 of the third lens group 173, the physical quantity A4 of the fourth lens group 174, and a physical quantity AC of the cam ring 202 can be expressed as the sum total ΣA of a physical quantity Ax. In the example illustrated in FIG. 17, the cam ring 202 can move such that the sum total ΣA of a physical quantity Ax is always zero while the lens device 160 is changed from the wide angle end to the telephoto end. However, the cam ring 202 does not necessarily need to move such that the sum total ΣA of a physical quantity Ax is always zero. This is because a drive range of the grooves in the cam ring 202 is restricted by, for example, a design restriction or the like. In such a case, the cam ring 202 can move such that, for example, the maximum value of the sum total ΣA of a physical quantity Ax for a case where the lens device 160 is changed from the wide angle end to the telephoto end is no more than one-third that of a case where the cam ring 202 does not restrict a change in the position of the center of gravity.

The cam ring 202 can move such that the width W of the change in position of the center of gravity of the lens device 160 when the lens device 160 is changed from the wide angle end to the telephoto end is less than 10% that of a case where the cam ring 202 does not restrict the change in the position of the center of gravity. In order to keep the optical axis of the lens device 160 horizontal, drive torque must be applied on the pitch axis of the gimbal 110. This drive torque is expressed as C (N·mm). Given this, the cam ring 202 can move such that a maximum value of the drive torque C when the lens device 160 is changed from the wide angle end to the telephoto end is less than 10% that of a case where the cam ring 202 does not restrict the change in the position of the center of gravity.

As described above, a change in the position of the center of gravity of the lens device 160 associated with the zoom action can be inhibited due to the movement of the cam ring 202 in the optical axis direction.

Figure 18:
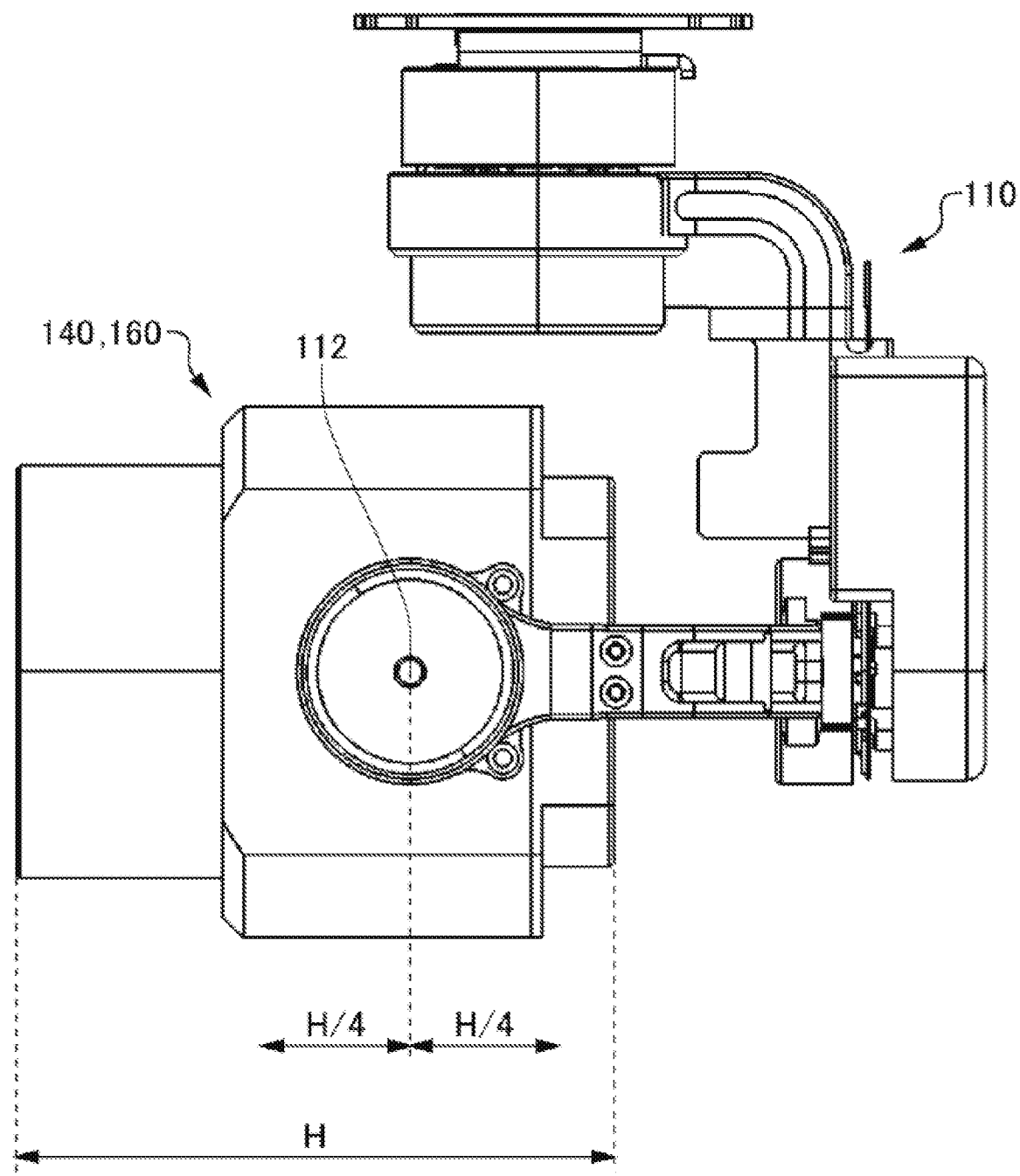
FIG. 18 illustrates one example of an attitude of an imaging device and lens device.
Figure 19:
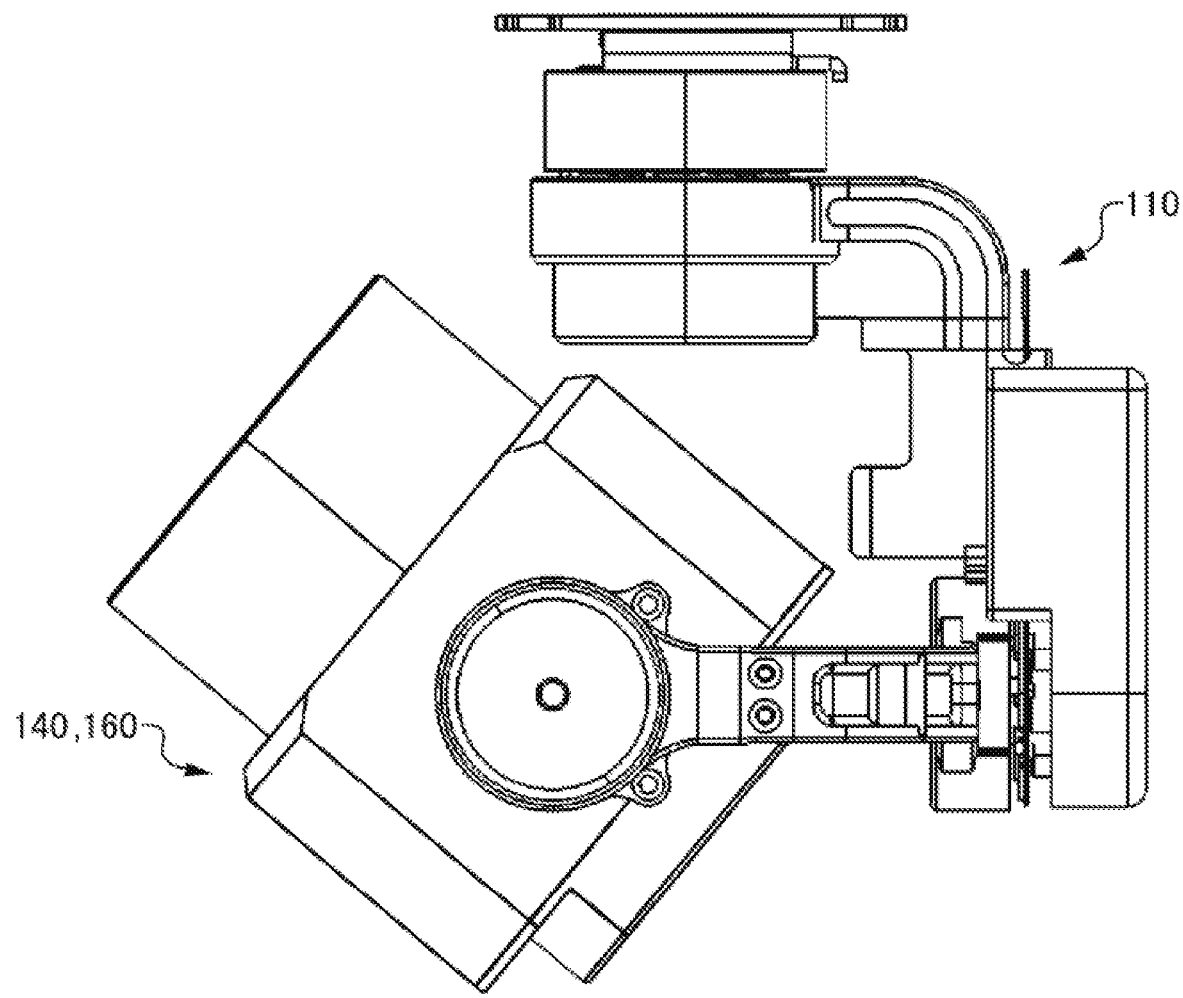
FIG. 19 illustrates one example of an attitude of the imaging device and lens device.
Figure 20:
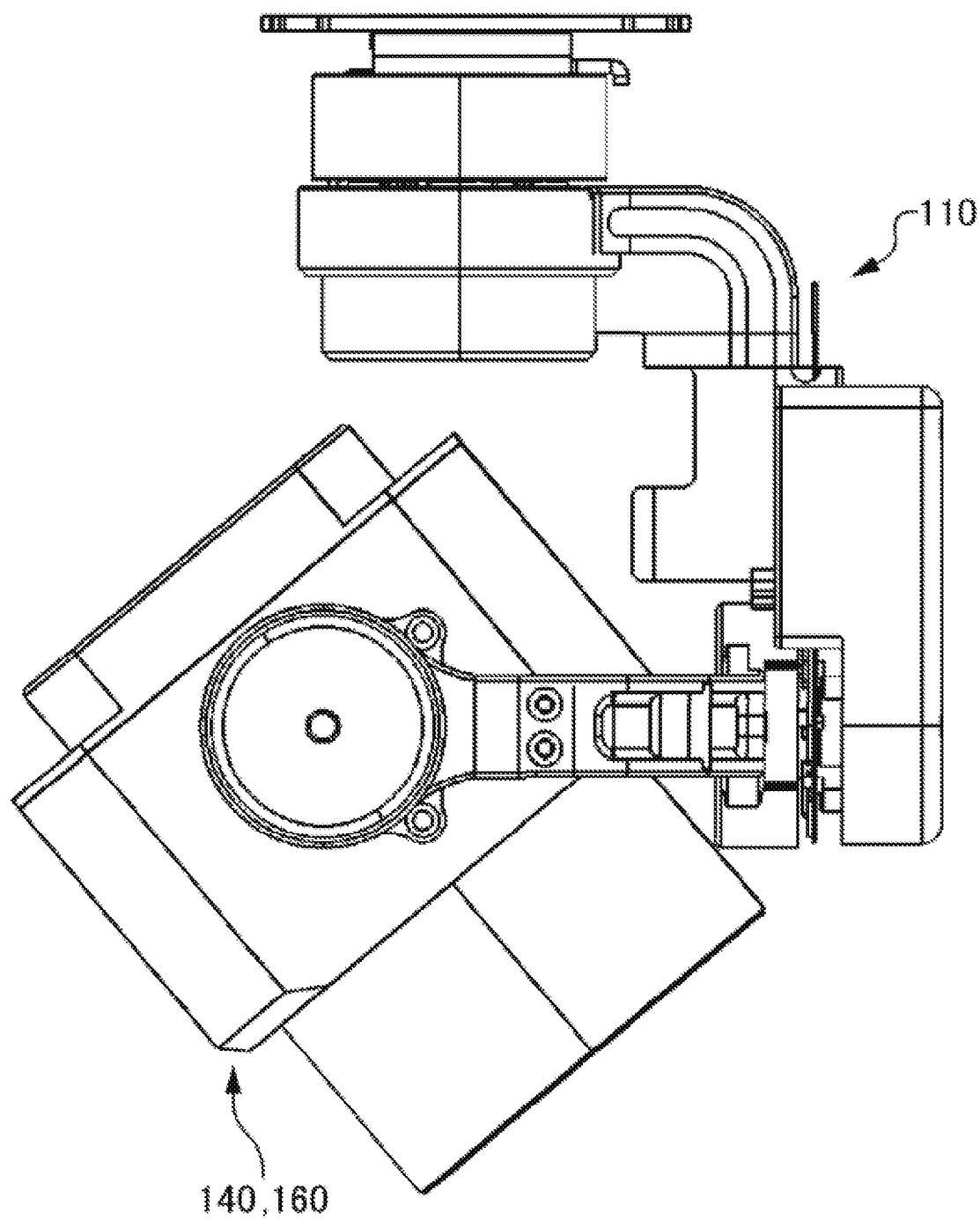
FIG. 20 illustrates one example of an attitude of the imaging device and lens device.

In some embodiments, the gimbal 110 can hold the imaging device 140 and the lens device 160 so as to be rotatable on the pitch axis, which runs through the center of gravity of the physical system that includes the imaging device 140 and the lens device 160. As illustrated in FIGS. 18 to 20, the gimbal 110 can rotate the imaging device 140 and the lens device 160 centered on the pitch axis and can hold the imaging device 140 and the lens device 160 at various attitudes. In addition, the lens device 160 can perform the zoom action and the focus action in various attitudes. However, the position of the center of gravity of the lens device 160 does not change due to the zoom action and the focus action. Therefore, when the position of the center of gravity of the physical system that includes the imaging device 140 and the lens device 160 is set on the pitch axis, even when the lens device 160 performs the zoom action and the focus action in various attitudes, the position of the center of gravity of the physical system that includes the imaging device 140 and the lens device 160 can be maintained on the pitch axis. Thus, the drive torque of the pitch axis rotation mechanism 112 does not change due to differences in the zoom action and the focus action of the lens device 160.

The pitch axis of the gimbal 110 does not necessarily run through the center of gravity of the physical system that includes the imaging device 140 and the lens device 160. The pitch axis of the gimbal 110 can be defined so as to be positioned within a predetermined range relative to the center of gravity of the physical system that includes the imaging device 140 and the lens device 160. For example, as illustrated in FIG. 18, the predetermined range can be a range spanning from the center of gravity of the physical system to a distance that is one-fourth the total length (H) of the physical system (i.e., H/4).

Figure 21:
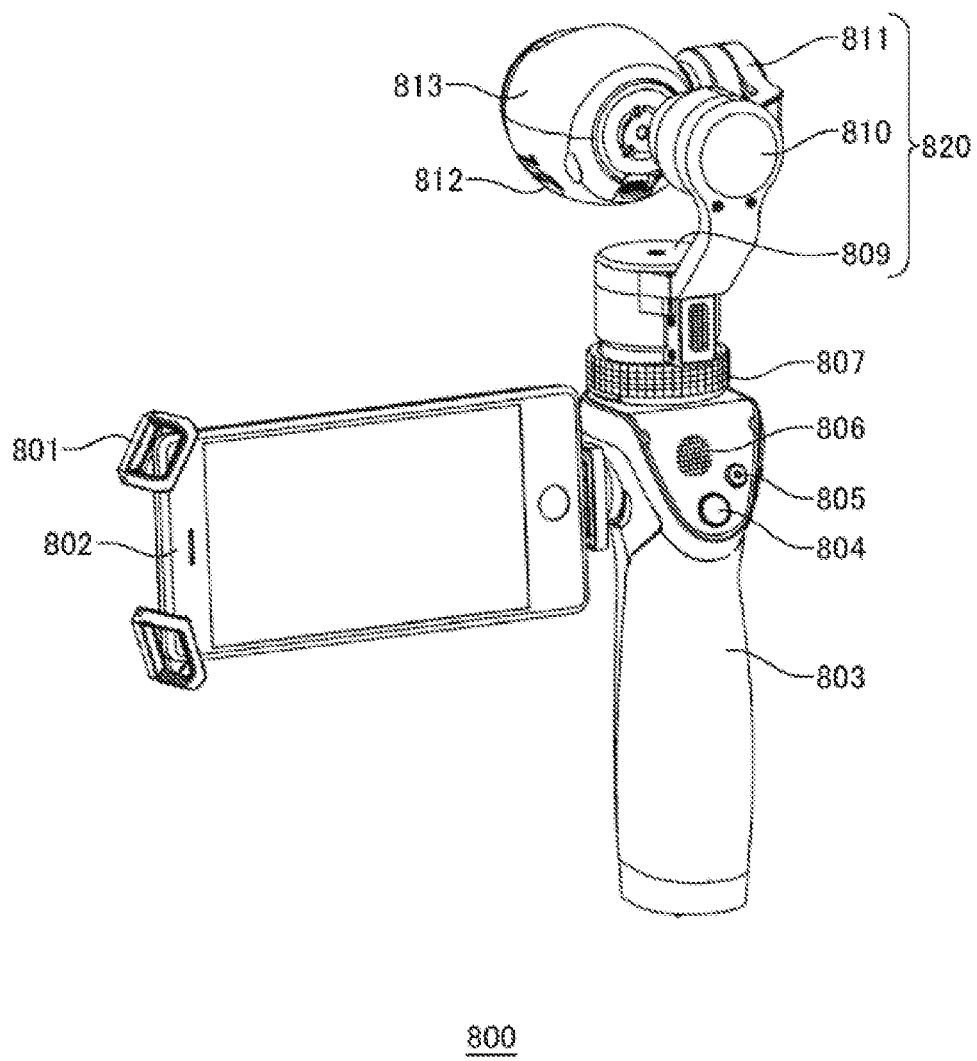
FIG. 21 is an exterior perspective view of an exemplary stabilizer.

FIG. 21 is an exterior perspective view of one example of a stabilizer 800. In the above, the UAV 100 with the imaging device 140 and the lens device 160 installed thereon was described. However, the imaging device 140 and the lens device 160 are not necessarily installed on the UAV 100. The imaging device 140 and the lens device 160 can be installed on a moving body other than the UAV 100. For example, a camera unit 813 provided to the stabilizer 800 is equivalent to the imaging device 140 and the lens device 160.

The stabilizer 800 can include the camera unit 813, a gimbal 820, and a holding arm 803. The gimbal 820 can rotatably support the camera unit 813. The gimbal 820 can include a pan axis 809, a roll axis 810, and a tilt axis 811. The gimbal 820 can rotatably support the camera unit 813 to rotate centered on the pan axis 809, the roll axis 810, and the tilt axis 811. The gimbal 820 is one example of a carrier. The camera unit 813 is one example of a lens device, or of a lens device and imaging device. The camera unit 813 can include a slot 812 for inserting memory. The gimbal 820 is fixed to the holding arm 803 via a holder 807.

The holding arm 803 can include various buttons for operating the gimbal 820 and the camera unit 813. The holding arm 803 can include a shutter button 804, a record button 805, and an operation button 806. By pressing down the shutter button 804, a still image can be recorded by the camera unit 813. By pressing down the record button 805, a moving image can be recorded by the camera unit 813.

A device holder 801 can be fixed to the holding arm 803. The device holder 801 can hold a mobile device 802 such as a smart phone. The mobile device 802 can be connected to the stabilizer 800 via a wireless network such as WiFi, so as to be capable of communication. Thus, an image captured by the camera unit 813 can be displayed on a screen of the mobile device 802.

The present disclosure is described using embodiments, but the technical scope of the disclosure is not limited to the scope in the above embodiments. It should be clear to a person skilled in the art that the above embodiments are open to various modifications or improvements. It should also be clear from the scope of the claims that forms having such modifications or improvements can be included in the technical scope of the present disclosure.

The order of each process in the operations, procedures, steps, stages, and the like of the devices, systems, programs, and methods in the scope of the claims, specification, and drawings is not specifically disclosed using "beforehand," "in advance," and the like, and any order is possible as long as a postprocess does not use the output of a preprocess. Even if "first," "next," and the like are used for convenience in describing the flow of operations in the scope of the claims, specification, and drawings, it is not meant that it must be executed in this order.

DESCRIPTION OF REFERENCE NUMERALS

101 UAV body
102 Communication interface
104 UAV control unit
106 Memory
110 Gimbal
112 Pitch axis rotation mechanism
114 Roll axis rotation mechanism
116 Yaw axis rotation mechanism
140 Imaging device
142 Imaging control unit
144 Imaging element
146 Memory
160 Lens device
161 Memory
162 Lens control unit
164 Actuation mechanism
165 Drive motor
166 Gear
168 Base
170 Lens
171 First lens group
172 Second lens group
173 Third lens group
174 Fourth lens group
180 Light amount adjustment mechanism
190 Lens
191 First focus lens
192 Second focus lens
194 Actuation mechanism
195 Lens holding member
196 Lens holding member
200 Moving member
202 Cam ring
204 Gear
210 Physical structure
212 Cam ring-operating cam groove
214 Second lens group-operating cam groove
216 Third lens group-operating cam groove
220 Second lens group cam pin
222 Third lens group cam pin
230 Lens holding member
232 Fixed cylinder
234 Cam ring support pin
236 Linear guide groove
300 Moving member
301 Fixed cylinder
302 Cam ring
306 Gear mechanism
307 Drive motor
310 Physical structure
311 Cam ring-operating cam pin
312 Cam ring-operating cam groove
313 First focus lens-operating cam pin
314 First focus lens-operating cam groove
315 Second focus lens-operating cam pin
316 Second focus lens-operating cam groove
319 Gear
321 Guide support
322 Guide support
330 Lens holding member
800 Stabilizer
801 Device holder
802 Mobile device
803 Holding arm
804 Shutter button
805 Record button
806 Operation button
807 Holder
812 Slot
813 Camera unit
820 Gimbal

What is claimed is:

1. A lens device comprising:
a first lens system including a first lens;
a second lens system including a second lens; and
a cam ring configured to move the first lens in an optical axis direction of the first lens, wherein the cam ring moves in a direction opposite to a movement direction of a center of gravity of the lens device according to a movement of the first lens.

2. The lens device of claim 1, further comprising:
a lens holding member configured to hold the first lens;
a cam provided to one of the lens holding member and the cam ring; and
a follower provided to another one of the lens holding member and the cam ring, the follower being configured to move along a cam surface of the cam to cause the lens holding member and the cam ring to move relative to each other.

3. The lens device of claim 1, wherein the cam ring includes a material having a specific gravity greater than a specific gravity of the first lens.

4. The lens device of claim 1, wherein the cam ring includes metal.

5. The lens device of claim 1, wherein the second lens system includes a single focus lens system.

6. The lens device of claim 1,
wherein:
the cam ring is a first cam ring; and
the second lens system includes a zoom lens system;
the lens device further comprising:
a second cam ring configured to move the second lens in an optical axis direction of the second lens, wherein the second cam ring moves in a direction opposite to a movement direction of a center of gravity of the lens device according to a movement of the second lens.

7. The lens device of claim 6, further comprising:
a lens holding member configured to hold the second lens;
a cam provided to one of the lens holding member and the second cam ring, and
a follower provided to another one of the lens holding member and the second cam ring, the follower being configured to move along a cam surface of the cam to cause the lens holding member and the second cam ring to move relative to each other.

8. The lens device of claim 6, wherein the second cam ring includes a material having a specific gravity greater than a specific gravity of the second lens.

9. The lens device of claim 6, wherein the second cam ring includes metal.

10. The lens device of claim 6, further comprising:
a light amount adjustment mechanism configured to move together with the first lens and adjust an amount of light that passes through the first lens;
wherein the second cam ring moves in a direction opposite to a movement direction of a center of gravity of the lens device according to movements of the second lens and the light amount adjustment mechanism.

11. The lens device of claim 10, wherein the light amount adjustment mechanism comprises:
an aperture with a variable opening diameter; and
an actuator configured to drive the aperture and modify the opening diameter of the aperture.

12. An imaging system comprising:
the lens device of claim 1, and
an imaging device configured to generate images based on light projected by the lens device to the imaging device.

13. The imaging system of claim 12, further comprising a carrier supporting at least one of the lens device or the imaging device.

14. The imaging system of claim 13, wherein the carrier supports the lens device and the imaging device such that a rotation axis for the lens device and the imaging device is within a predetermined range of distance from a center of gravity of a physical system that includes the lens device and the imaging device.

15. The imaging system of claim 14, wherein the rotation axis runs through the center of gravity of the physical system that includes the lens device and the imaging device.

16. A movable object comprising the imaging system of claim 13.

17. The movable object of claim 16, wherein the movable object is an unmanned aerial vehicle.

18. The imaging system of claim 13, further comprising:
a holding arm attached to the carrier.

19. A lens device comprising:
a first lens system including a first lens;
a second lens system including a second lens;
a moving member configured to move in an optical axis direction of the first lens, the moving member including a material having a specific gravity greater than a specific gravity of the first lens; and
a physical structure configured to:
move the first lens in the optical axis direction, and
move the moving member in a direction opposite to a movement direction of a center of gravity of a physical system that includes the first lens.

20. An imaging system comprising:
a lens device including:
a first lens system including a first lens;
a second lens system including a second lens;
a moving member configured to move in an optical axis direction of the first lens, the moving member including a material having a specific gravity greater than a specific gravity of the first lens; and
a physical structure configured to:
move the first lens in the optical axis direction, and
move the moving member in a direction opposite to a movement direction of a center of gravity of a physical system that includes the first lens;
an imaging device configured to generate images based on light projected by the lens device to the imaging device; and
a carrier supporting the lens device and the imaging device such that a rotation axis for the lens device and the imaging device is within a predetermined range of distance from a center of gravity of a physical system that includes the lens device and the imaging device.

* * * * *